United States Patent [19]
Henderson et al.

[11] Patent Number: 6,058,103
[45] Date of Patent: May 2, 2000

[54] NETWORK MANAGEMENT SYSTEM

[75] Inventors: Gregory Scott Henderson, Plano; Wayne B. Perry, Richardson; Thomas Dennie Franklin, Plano; Ed J. Sanders, Jr., Ft. Worth; Von A. Cooley, Richardson, all of Tex.

[73] Assignee: MCI Communications Corporation, Washington, D.C.

[21] Appl. No.: 09/032,778

[22] Filed: Mar. 6, 1998

Related U.S. Application Data

[62] Division of application No. 08/605,597, Feb. 22, 1996, Pat. No. 5,726,979.

[51] Int. Cl.[7] ........................................ H04L 12/28
[52] U.S. Cl. .................................. 370/254; 709/223
[58] Field of Search ........................ 370/241, 244, 370/250, 252, 254, 255, 351; 395/140, 500, 701, 712, 133, 138, 326, 333, 334, 339, 340, 200.02, 200.1, 201, 708, 200.19, 707, 683, 800, 118, 501, 526, 651; 364/977, 977.1, 284, 284.4, 286; 709/223, 224, 225, 220

[56] References Cited

U.S. PATENT DOCUMENTS

| | | |
|---|---|---|
| 5,276,789 | 1/1994 | Basow et al. . |
| 5,285,494 | 2/1994 | Sprecher et al. . |
| 5,375,199 | 12/1994 | Harrow et al. . |
| 5,432,932 | 7/1995 | Chen et al. . |
| 5,457,797 | 10/1995 | Butterworth et al. . |
| 5,490,276 | 2/1996 | Doli, Jr. et al. . |
| 5,495,607 | 2/1996 | Pisello et al. . |
| 5,546,577 | 8/1996 | Marlin et al. . |
| 5,568,471 | 10/1996 | Hershey et al. ..................... 370/245 |
| 5,572,640 | 11/1996 | Schettler . |
| 5,726,979 | 3/1998 | Henderson et al. ................ 370/254 |

*Primary Examiner*—Huy D. Vu

[57] ABSTRACT

A system and method for managing a telecommunications network. The system and method employs a network management architecture that provides an overlay in which network management functions are performed. The network management architecture includes a workstation function that provides a graphical user interface (GUI) for a user to interact with an object model of the physical telecommunications network, a telecommunications network management subsystem that provides an object model of the network including object models of network equipment and connectivity between the equipment, a database subsystem that stores "current" and "future" views of the network, and an object request broker that translates objects from a first object-oriented paradigm to a second object-oriented paradigm for use by the GUI. The network management architecture facilitates network design by determining network performance metrics. The network architecture can also be used to assess the performance of a given network configuration by virtue of simulation. The network architecture can also be used to initialize switchover logic for network restoration.

18 Claims, 16 Drawing Sheets

TOPOGRAPHICAL

TOPOLOGICAL

CORBA

TOPOGRAPHICAL

TOPOLOGICAL

Reference Table

| TABULAR SITE CONNECTION MATRIX | | | |
|---|---|---|---|
| CONNECTION # | SOURCE SITE | INTERMEDIATE SITES | SINK SITE |
| 511 | A | | B |
| 512 | A | G | H |
| 513 | A | | C |
| 514 | A | | G |
| 515 | C | A | B |
| 516 | C | | D |
| 517 | D | | E |
| 518 | E | | F |
| 519 | G | | E |
| 520 | G | E | F |
| 521 | G | E,D | C |
| 522 | G | | H |

| Resource | Priority |
|----------|----------|
| E1 | 0 |
| E2 | 1 |
| O1 | 2 |
| O2 | 3 |
| O3 | 4 |
| O4 | 5 |

FIG. 8A

| Resource | Priority |
|----------|----------|
| E1 | 0 |
| E2 | 0 |
| O1 | 1 |
| O2 | 2 |
| O3 | 2 |
| O4 | 3 |

FIG. 8B

| Resource | Priority |
|----------|----------|
| E1 | 1 |
| E2 | 1 |
| O1 | 0 |
| O2 | 2 |
| O3 | 2 |
| O4 | 3 |

FIG. 8C

NETWORK MANAGEMENT SYSTEM

This application is a divisional of U.S. patent application Ser. No. 08/605,597, filed Feb. 22, 1996 now U.S. Pat. No. 5,726,979.

Background of the Invention

1. Field of the Invention

The present invention relates generally to telecommunications networks. More particularly, the present invention relates to managing a telecommunications network containing diverse network elements conforming to a variety of telecommunications protocols.

2. Related Art

As telecommunications networks become more complex, telecommunication network service providers require increasingly capable network management systems. The network management systems face substantial hurdles to acceptance by network service providers. One such hurdle is that the network management systems have to manage networks comprised of network equipments that comply with a variety of interface standards. An example of such an interface standard is the well-known common management interface protocol (CMIP). Not only must a telecommunications network management system manage diverse network elements, but it must also manage network growth and/or modification. Conventional telecommunication network management systems do not provide a mechanism for representing the physical network in an efficient manner to facilitate network design and maintenance. Nor do they adequately provide for representing a physical network's evolution to a new configuration.

Moreover as the networks become more capable telecommunication services providers are faced with increased service demand. Increased service demand, in turn, requires increased communication bandwidth. To meet the increased communication bandwidth requirements, many service providers have turned to optical communications. In response to the increased demand for optical telecommunications equipment, a number of vendors have entered the marketplace. To allow telecommunications network designers to connect equipments from various vendors together into a heterogenous fiber optic telecommunications networks, synchronization (also referred to as timing) interconnectivity standards had to be developed. One such standard is the Synchronous Optical NETwork (SONET). An overview of SONET can be found in JOHN BELLAMY, DIGITAL TELEPHONY, 403–26 (John Wiley & Sons, Inc. 1991), hereby incorporated by reference.

A SONET network distributes synchronization in the SONET optical signal rate. To do so, a source clock produces an electrical timing signal to be distributed. The source clock is an extremely stable clock. Such a clock is generally referred to as a Stratum-1 source. A Stratum-1 source is a highly reliable timing source (having a free running inaccuracy on the order of one-part in $10^{11}$).

The electrical timing signal feeds a frequency multiplier in a SONET transmitter. The frequency multiplier multiplies the timing signal to generate a derived SONET optical signal rate. The SONET transmitter transmits data to a SONET receiver at the derived optical signal rate. The SONET receiver extracts the derived optical rate. The SONET receiver divides the extracted optical rate by the multiplication factor applied by the frequency multiplier to produce the distributed electrical timing signals.

SONET equipment can adapt to network equipment failure by modifying the synchronization topology of the network. However, such modification may cause problems in the resulting network synchronization topology. For example, the modification can result in timing loops and loss of traceability to a Stratum-1 source. Modern networks ensure traceability of timing back to a Stratum-1 source to ensure timing stability. A timing loop occurs when a particular piece of timing equipment is referred to more than once in a particular path. A path connects a source of timing to a user of timing. A timing loop can result in the complete loss of a particular path. This is because the path's timing continually tries to catch itself, eventually culminating in the loss of synchronization. Thus, it is desirable to design a telecommunications network that does not have timing loops, and that has traceability back to Stratum-1. Moreover, as a telecommunications network reconfigures itself to circumvent network failures, the restored configuration must avoid timing loops and maintain Stratum-1 traceability.

What is required therefore is a telecommunications network management system to aid in the design and maintenance of a robust telecommunications network. The system should be capable of managing diverse network equipments conforming to a variety of interface standards. The system should also be able to determine the current state of a network, restore it to a state satisfying various engineering design guidelines. The network management system should be flexible enough to allow upgrades (i.e., addition of new equipment and changes in network topology) without violating the engineering design guidelines.

SUMMARY OF THE INVENTION

The present invention is directed to a system and method for managing a telecommunications network. The system and method employs a network management architecture that provides an overlay in which network management functions are performed. The network management architecture includes a workstation function subsystem that provides a graphical user interface (GUI), a telecommunications management network (TMN) subsystem, a database subsystem, and an object request broker (ORB). Using the GUI, a user (e.g., a network designer) can interact with an object model of the physical telecommunications network. The TMN subsystem provides an object model of the telecommunications network. The current configuration of the managed network is referred to as a "current" view. The object model can represent a configuration of the network projected to some future date. The projected configuration of the managed network is referred to as a "future" view. The database subsystem stores records that are used to construct "current" and "future" views of the network. The ORB maps objects from a first object-oriented paradigm to a second object-oriented paradigm for use by the GUI.

One aspect of the present invention is a novel network management architecture that provides sufficient flexibility to allow for management of a modern telecommunications network. The telecommunications network can contain diverse network equipments that conform to differing communications protocols. The network management architecture contains a management information base. The management information base contains a run-time object model of the telecommunications network. The run-time model can represent the projected configuration of the network at some future date.

The run-time object model generally conforms to the TMN standard. Because the TMN standard does not adequately model the physical connectivity of the network (e.g., path traces between network elements), the present invention includes extensions to the conventional TMN object models. The extensions to conventional TMN object models allow the present invention to more realistically model and display the telecommunications network. Thus, the software architecture stores an object model representation of the physical network. The stored object model representation represents the current configuration of the network or the configuration of the network projected to some future date. In this specification, an object model representation of a telecommunications network is also referred to as an object store or a workset.

The present invention also provides a workset manager. The workset manager interacts with a database having records that are used to construct various network configurations. By so interacting, the workset manager provides the desired run-time model of the network to the TMN subsystem. Using a network management architecture designed according to a preferred embodiment of the present invention, a network designer can simulate the behavior of the network to proposed modifications of the network. Modifications include adding, removing, or changing the configuration of network elements, as well as modifying the topology of the telecommunications network. By simulating modifications to the network configuration, a network designer can study the effect of a proposed network configuration prior to physical implementation. Modifications can be made incrementally, e.g., to monitor the progress of a proposed plan of upgrade to the telecommunications network. The object models can be stored and indexed according to project (plan of network modification) and/or date (network configuration at some time in the future).

The network management architecture includes a database subsystem that provides long-term storage of records that are used to construct "current" and "future" views of the telecommunications network. Access to the database is provided by a set of database procedures that provide a standard database interface to the database subsystem.

The network management architecture also includes a workstation subsystem. The workstation subsystem provides a graphical user interface (GUI). The GUI allows a network designer to perform network management functions by providing the network designer with access to the run-time object model representations of the telecommunications network. The GUI includes additional capabilities for improving the display of the network to a user. The additional capabilities include reducing screen clutter, displaying linked topological and topographical views, and network zooming.

The present invention also provides telecommunication network management functions. One such management function is the design of synchronization distribution in a telecommunications network. The design of synchronization distribution includes loop detection, traceability, diversity assurance, and selection table initialization.

Traceability refers to determining the source of a particular network communication. According to a preferred embodiment of the present invention, traceability is provided through extensions to the TMN standard. In the context of the synchronization, the present invention allows a network designer to assure that a given network configuration assures traceability to a highly reliable timing signal source.

Loop detection analysis determines whether a particular network element appears in a particular communication's distribution path more than once. The presence of a loop in a synchronization path of a telecommunication network can result in severely degraded network performance.

Diversity refers to providing different paths for communication between a particular source and a particular destination of a communication signal. In the context of the present invention, diversity means minimizing the number of common network elements in different paths between the source and destination of a communication signal. The present invention provides for diverse communication paths between communications sites. By doing so, the present invention enhances the robustness of the network to network failures. That is, the network can restore itself in the event of a failure by switching to a working path.

Priority in the context of the present invention is related to network restoration. The present invention incorporates a novel priority scheme to prevent needless, and potentially harmful, switchovers between network equipment having essentially the same performance characteristics. The novel priority scheme assigns equal priority levels to equipments for which no mutual switchover is desired.

Another aspect of the present invention uses the software architecture to manage synchronization distribution in a SONET/SDH telecommunications network. The telecommunications network includes timing network elements and SONET network elements that derive their timing from the timing network elements. The system extracts requisite data from the physical telecommunications network to build an object model representation of the network, thereby modeling synchronization paths between the various equipments included in the network. The object model representation is stored in a management information base (MIB) contained in the TMN subsystem. The database can be modified corresponding to changes in the telecommunications network. The system provides a GUI through which a network designer interacts with the object model representation to manage the telecommunications network.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein:

FIGS. 8A–C are resource priority assignments for a selector switch in a SONET network element.

DETAILED DESCRIPTION OF THE PREFERRED EMBODIMENTS

Table of Contents

| | | |
|---|---|---|
| I. | Network Management Architecture for Remote Management . . . of a Telecommunications Network | 10 |
| II. | Human-Machine Interface (HMI) . . . | 24 |
| III. | GUI . . . | 26 |
| IV. | Network Management Functions and Performance Metrics . . . | 31 |
| V. | Synchronization Distribution Management . . . | 36 |
| VI. | Network Simulation . . . | 46 |

I. Network Management Architecture for Remote Management of a Telecommunications Network One aspect of the present invention provides a telecommunications network management system with the capability to design, simulate, and modify the topology of a telecommunications network. In this specification, a telecommunications network is alternately referred to as a network. Using the present invention, a network engineer can simulate and evaluate a particular network topology, prior to physically modifying the topology of the network. This is accomplished by performing network management functions on an object store representation (described below) of the telecommunications network. An object store representation is a run-time object-oriented model of the physical telecommunications network.

Figure 1A:
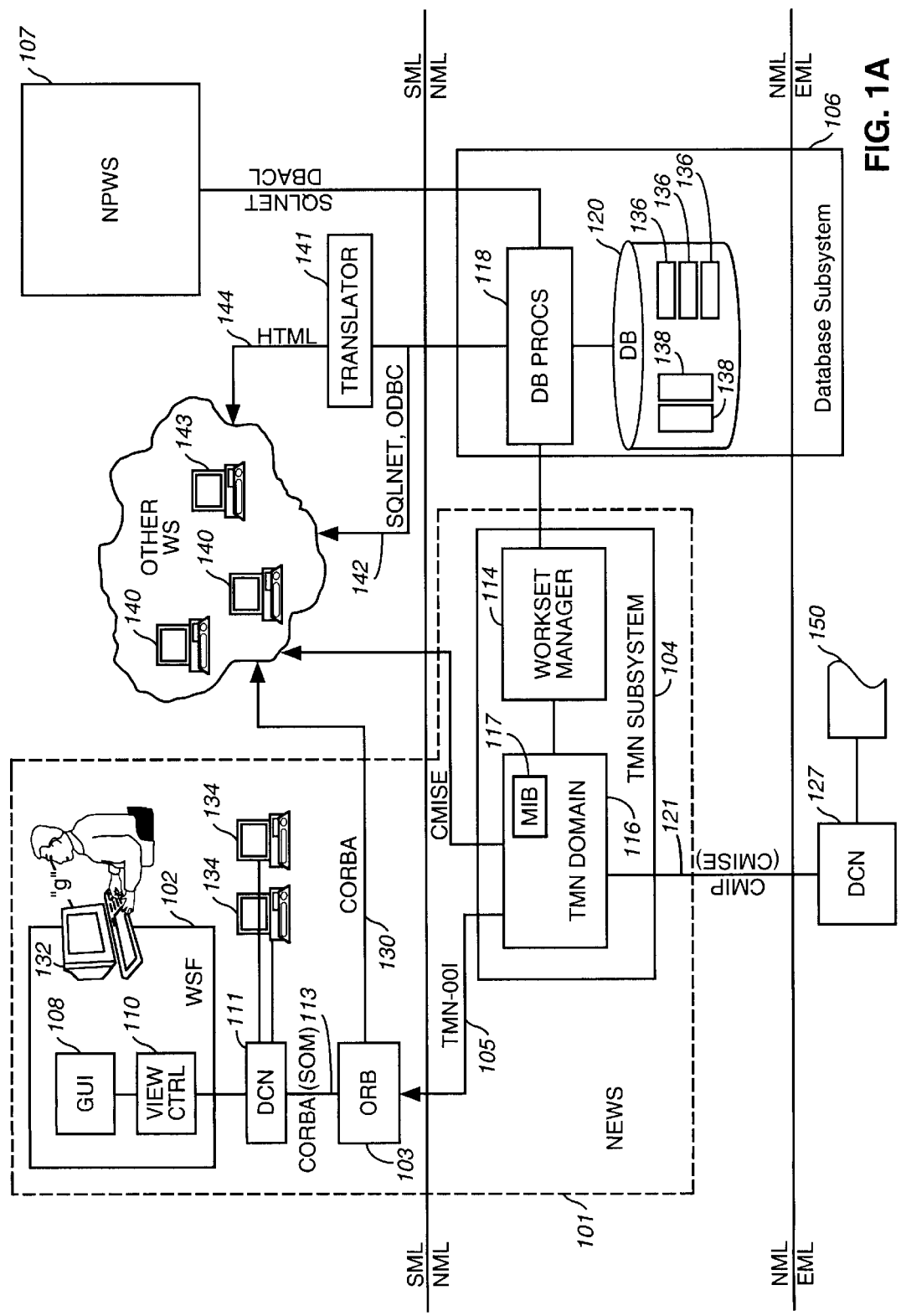
FIG. 1A is a network management architecture for telecommunications network management according to a preferred embodiment of the present invention.

A network management architecture 100 for management of a telecommunications network according to a preferred embodiment is illustrated in FIG. 1A. The network management architecture 100 contains a network engineering workstation (NEWS) 101 and a database subsystem 106. The database subsystem 106 is coupled to the NEWS via database procedures 118. The network management architecture 100 can optionally include a network provisioning workstation (NPWS) 107 coupled to the NEWS 101 via the database procedures 118.

The NEWS 101 includes a workstation function (WSF) subsystem 102, an object request broker (ORB) 103, and a telecommunications management network (TMN) subsystem 104. The WSF 102 is coupled to the ORB 103 via a data communications network (DCN) 111 (DCNs are described below). In the preferred embodiment, the TMN subsystem 104 is coupled to the ORB 103 via a telecommunications management network object-oriented interface (TMN-OOI) 105. The TMN subsystem 104 is also coupled to a telecommunications network 150. The telecommunications network 150 is managed by the network management architecture 100. The TMN subsystem 104 coupling to the network 150 is through a DCN 930 via a communications management interface protocol (CMIP) compliant interface 121. One such CMIP-compliant interface is the well-known common management interface switch element (CMISE) interface.

In the preferred embodiment, the TMN subsystem 104, the database subsystem 106, and the ORB 103 are executed on a single platform. It would be apparent to those skilled in the art, however, that other implementations are possible. For example, each subsystem 102, 104, and 106, and the object broker 103 can execute on a separate computing platform.

The NEWS 101 serves to aid in designing the synchronization distribution plan for a network. Specifically, the NEWS enables the selection of viable, diverse, loop-free paths for timing distribution, restoration, and monitoring. The NEWS 101 performs simulations of the behavior of a proposed network to discover weaknesses in the synchronization distribution plan. Such simulation is described below in Section VI. The simulations can include scenarios wherein particular network equipments or communications links are simulated to have failed. In this manner, a network designer can observe the behavior of the simulation to predict the behavior of the physical network 150.

The WSF subsystem 102 is coupled to the ORB 103 through a DCN 111. The WSF subsystem 102 contains a graphical user interface (GUI) 108 and a view controller 110. The GUI 108 provides a user-friendly interface for a network designer. Using the GUI 108, the network designer makes requests to the remainder of the system to perform network management functions. The GUI 108 also displays results of the requests made by the network designer. As described below, the GUI 108 contains routines to increase the utility of the displayed results to the network designer.

According to a preferred embodiment of the present invention, an Object Request Broker (ORB) 103 is included in the NEWS 101. The ORB 103 permits a more generic interface 113 to an object model. The object model is equivalent to the run-time TMN model contained in the MIB 117. In the preferred embodiment, generic interface 113 is a CORBA-compliant interface, and the equivalent object model is a CORBA-compliant object model. Example of such a CORBA-compliant interface include the well-known SOM and DSOM interfaces by IBM Corp. The use of the ORB 103 allows for low cost, non-TMN-compliant workstations to perform the functions necessary to accomplish engineering functions. One such engineering function is synchronization distribution planning. As depicted by connection 130, a workstation can generally access the TMN domain 116 through a CORBA-compliant interface rendered by the ORB 103. The specific workstation 132 used in the NEWS 101 can access the ORB 103 through a DCN 111. Other NEWS workstations 134 can access the same ORB 103 via a connection through the DCN 111.

The view controller 110 provides an interface between the GUI 108 and the ORB 103. The view controller 110 translates network management requests from the GUI 108 into CORBA-compliant object requests. The CORBA-compliant object requests are transmitted to the ORB 103 over the interface 113. The view controller 110 also translates CORBA-compliant result data transmitted from the ORB 103 over the interface 113 into display data that is usable by the GUI 108 so that it can be displayed to a network designer.

Figure 2A:
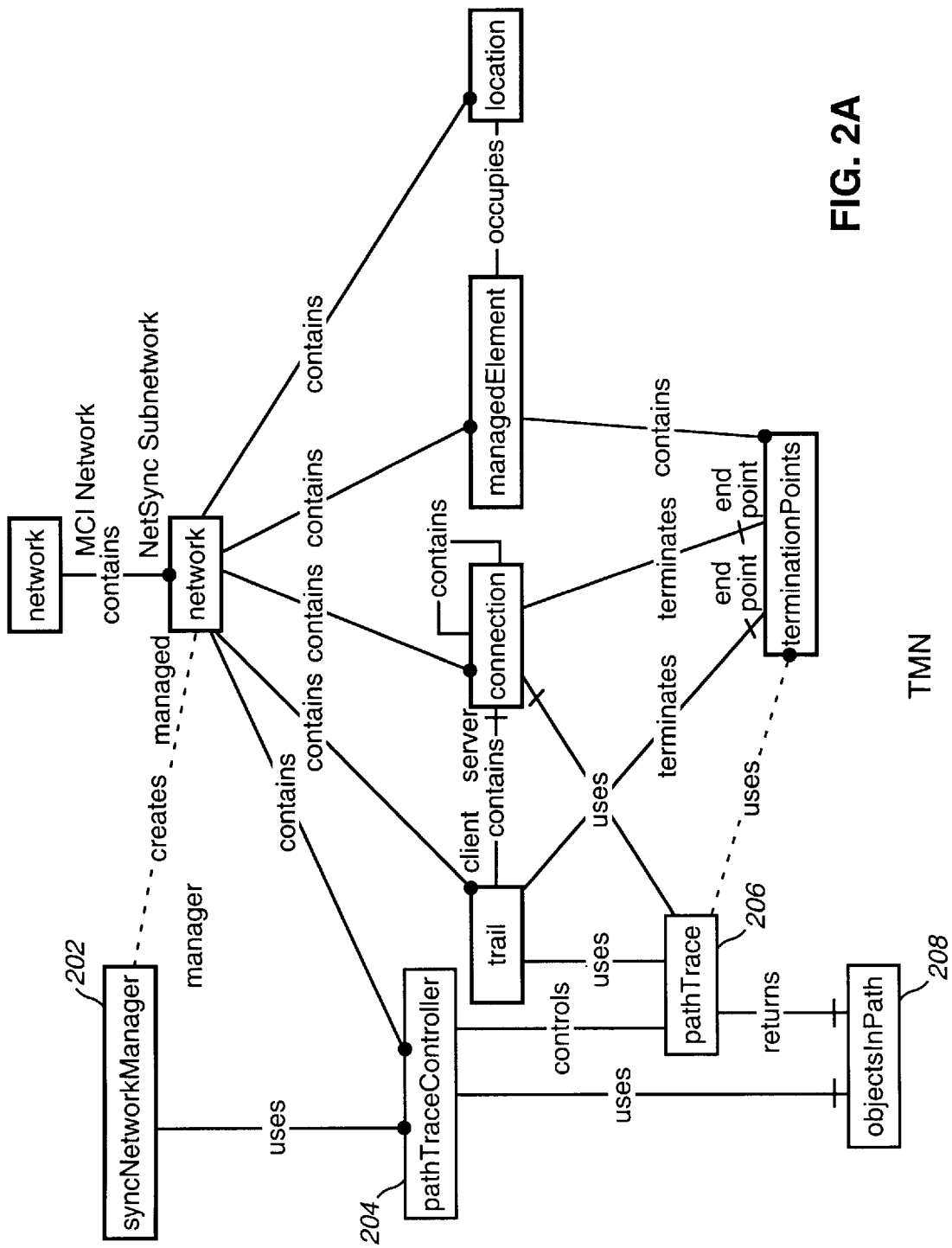
FIG. 2A is a TMN-compliant object model representation of a network.

An example of a TMN-compliant object is illustrated in FIG. 2A. It would be apparent to those skilled in the art that the object represented in FIG. 2A conforms with standard TMN objects (as defined in the International Telecommunication Union (ITU) M.3xxx Series Recommendations), with the exception of the syncNetworkManager 202, the pathTraceController 204, the pathTrace 206, and the objectsInPath 208. The syncNetworkManager 202 contains the overall network configuration. One syncNetworkManager 202 is instantiated for each subnetwork in the network 150. The pathTraceController 204 determines a path between two elements. The pathTrace 206 is a single path that connects a given pair of network elements. The objectsinPath 208 contains a list of intervening objects (representing other network elements), in a particular path between a given pair of network elements.

There is another deviation from standard TMN object model in the preferred embodiment that deserves note. The trail class in standard TMN does not provide a mechanism whereby trails can be contained within a trail. This presents a problem when trying to model SONET networks. This is because although SONET links, lines, and sections are most readily modeled by the TMN trail class, SONET links, lines, and sections can contain one another. That is, a SONET link can contain one or more SONET lines. Moreover, a SONET line can contain one or more SONET sections. Such modeling was not possible in standard TMN.

Figure 3A:
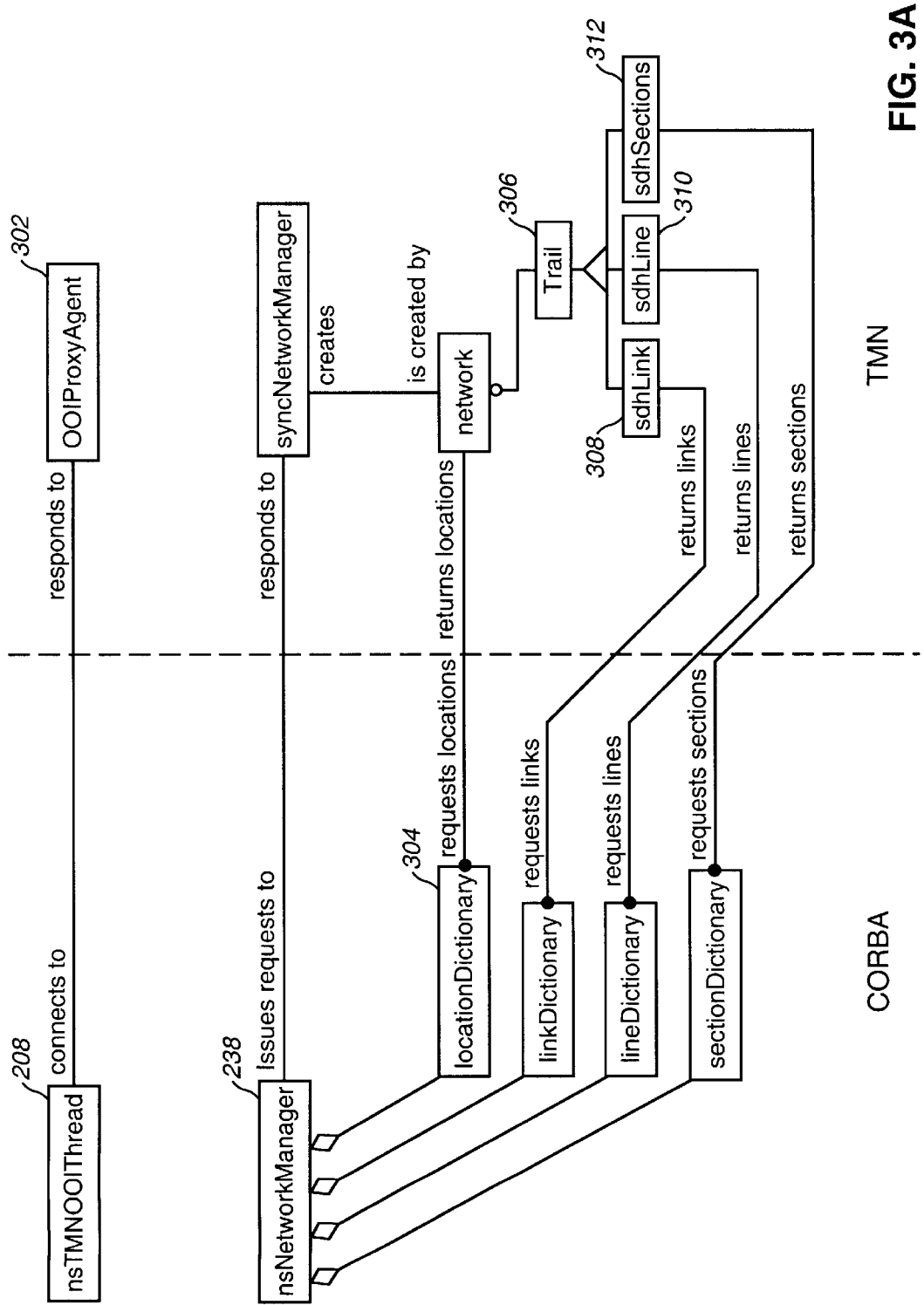
FIGS. 3A–C illustrate mapping from a TMN-compliant object to a CORBA-compliant object.

To overcome this problem, the preferred embodiment uses a trail class that has been modified from the TMN standard. The modified trail class is illustrated in FIG. 3A. Referring to FIG. 3A, the modified trail class 306 has three child classes: an sdhLink class 308, an sdhLine class 310, and an sdhSection class 312. The sdhLink class 308, sdhLine class 310, and sdhSection class 312 each have the structure required to allow containments of the appropriate classes. Thus, the sdhLink class 308 can contain line objects and the sdhLine 310 can contain section objects. Such containment is not available in the TMN standard because the standard trail class does not provide for containment of trail objects.

Figure 2B:
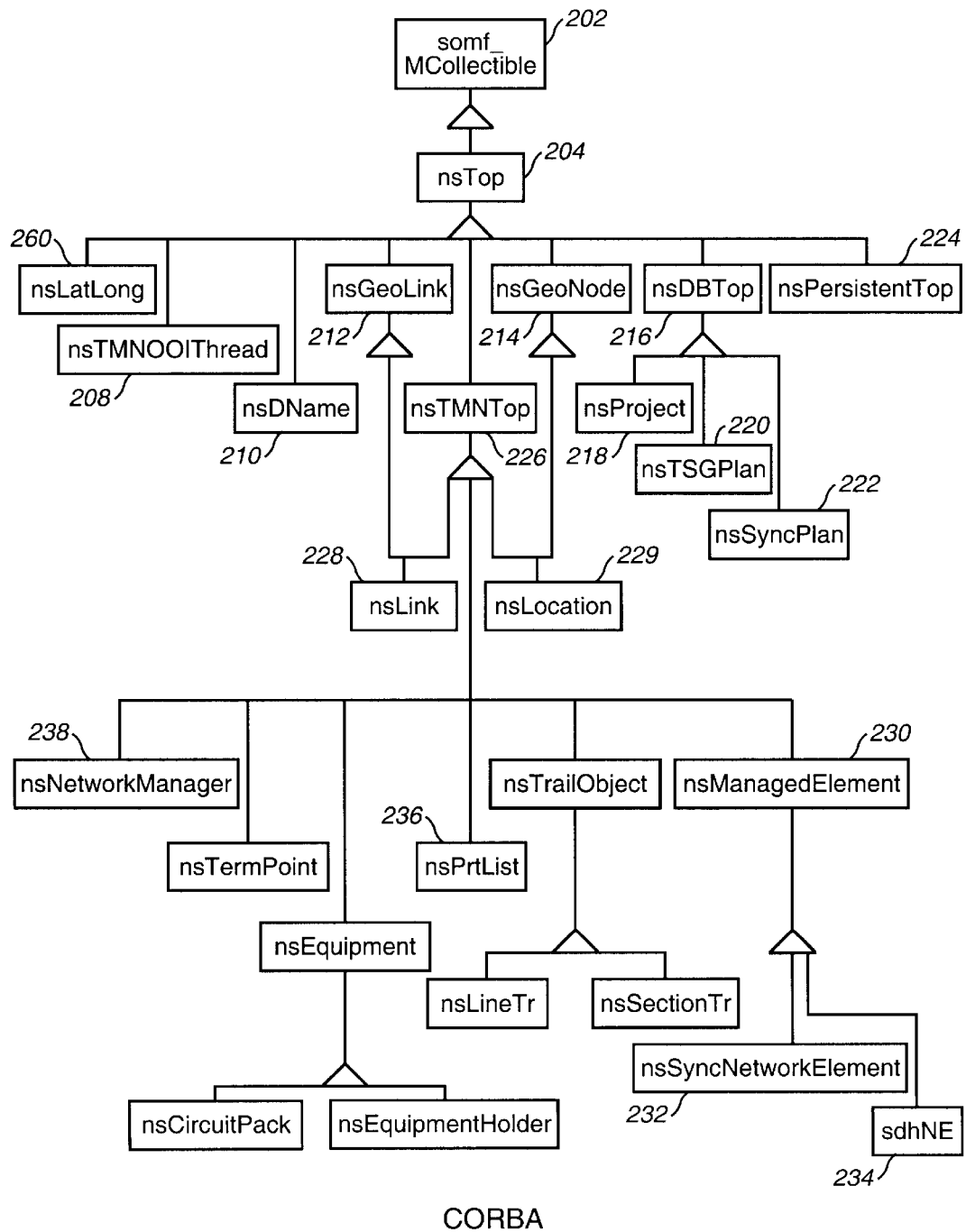
FIG. 2B is a CORBA-compliant class hierarchy for representing of a network.

FIG. 2B illustrates a class hierarchy for a CORBA-compliant object representation of a telecommunications network. Referring to FIG. 2B, the classes of the CORBA-compliant object are explained. The somf_MCollectible 202 class is the base class for all the other classes in FIG. 2B. The somf_MCollectible class 202 allows for all other classes to exist in the memory of a processing system, for example, in the form of a linked list or similar data structure. The nsTop class 204 is a base class for all of the network object model object classes. The nsTop class 204 contains functionality for creation and deletion of distributable network object model objects on both client and server sides. The nsTop class 204 also implements general security and authorization functions that are common to all classes lower in the hierarchy. The nsLatLong class 206 represents an item of latitude and longitude data. The nsTMNOOIThread Class 208 maintains a connection between a CORBA-compliant object model and a corresponding TMN-compliant object model. The nsTMNOOIThread class 208 can contain an object reference or "handle" that allows a CORBA-compliant object model and a corresponding TMN-compliant object model to communicate. The nsDName class 210 holds a unique distinguished name for an object in accordance with TMN standards. The nsGeoLink class 212 and the nsGeoNode class 214 handle graphical rendering of communications links and communications equipments for presentation on, for example, a geographical map.

The nsDBTop class 216 and its child classes (nsProject class 218, nsTSGPlan class 220, and nsSyncPlan class 222) are included for practical reasons to store project and plan information in the database 120. An instance of the nsProject class 218 holds a list of locations that are involved in a given project. The nsTSGPlan class 220 contains a list of all timing signal generators (TSGs) for each of several locations. The nsSycnPlan class 222 is essentially a name placeholder to identify a particular synchronization plan. Instances of the nsProject class 218 and the nsSyncPlan class 222 can contain multiple instances of one another.

The nsPersistance class 224 handles local persistent data. Such data includes, for example, user preferences.

The nsTMNTop class 226 is a base class for all CORBA classes that have counterparts in the TMN class hierarchy (described in FIG. 2A). In keeping with the TMN concept of having a unique distinguished name for every TMN object, the nsTMNTop class 226 attaches an nsDName class 210 to each instantiation of a CORBA class. The nsLink class 228 is analogous to the TMN link class. When instantiated, the nsLink class 228 represents a particular communications link in a managed network. The nsLocations class 229 is analogous to the well-known TMN location class.

The remainder of the classes derived from the nsTMNTop 226 substantially correspond to similar classes in the TMN class hierarchy. However, there are a few notable exceptions. The nsManagedElement class 230 is further divided into two child classes: the nsSyncNetworkElement class 232 and the sdhNE class 234. The nsPriList class 236 represents the priority list for the switching selector table contained in a network equipment. As described above, the switching selector table selects which of a plurality of timing reference signals to use. The nsNetworkManager class 238 provides general services for operation of the NEWS 101 on the CORBA side. This function can include creation, instantiation, and deletion of worksets.

By mapping objects from TMN-compliant objects to CORBA-compliant objects, the object broker 103 provides the interface between the TMN subsystem 104 and the WSF subsystem 102. It would be apparent to those skilled in the art that the object broker of the present invention can be designed to map between any two object protocols. Thus, the present invention is not limited to mapping TMN-compliant objects to CORBA-compliant objects. Rather, the present invention can be used to interface other object domains.

Figure 3B:
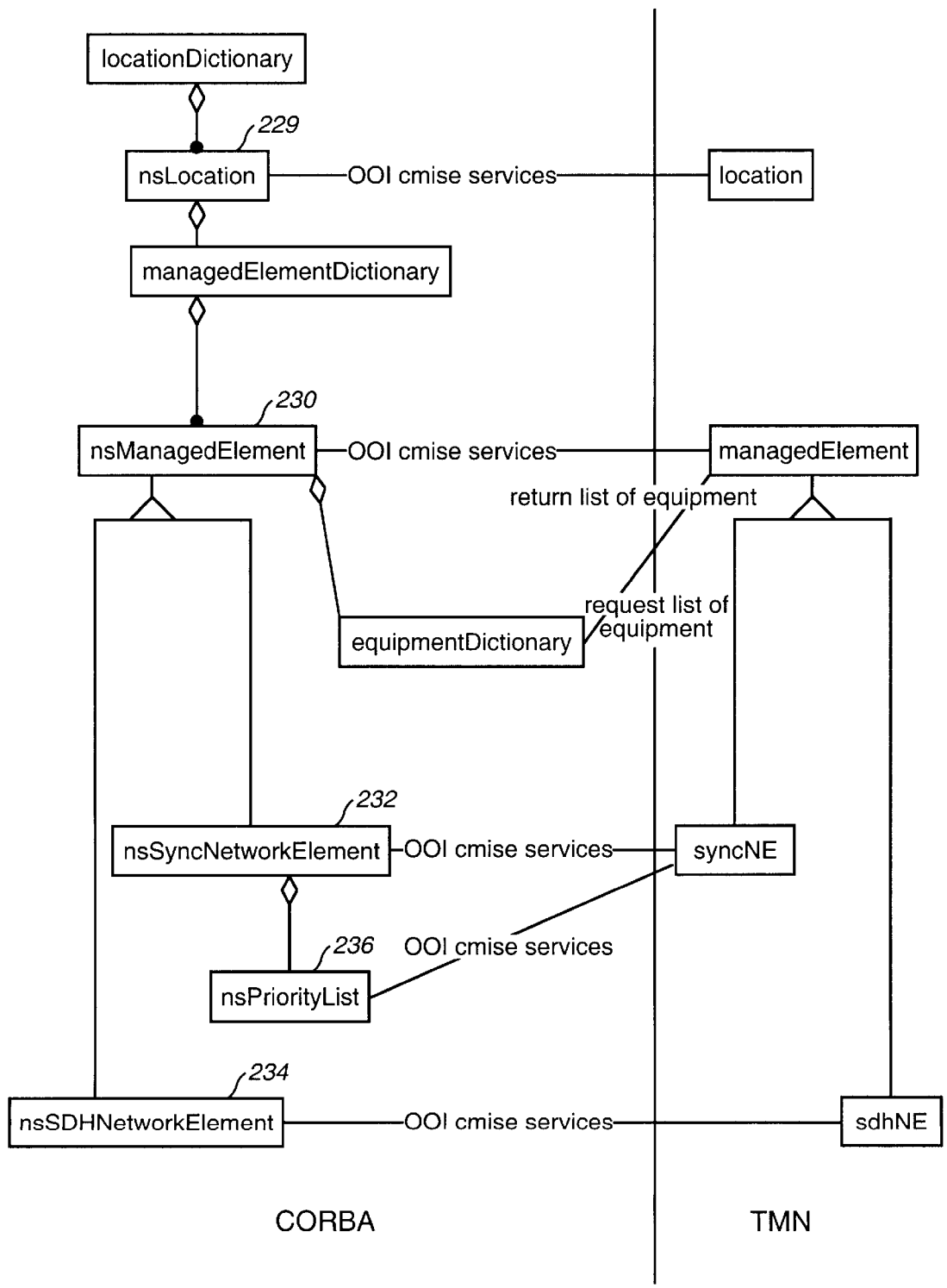
Figure 3C:
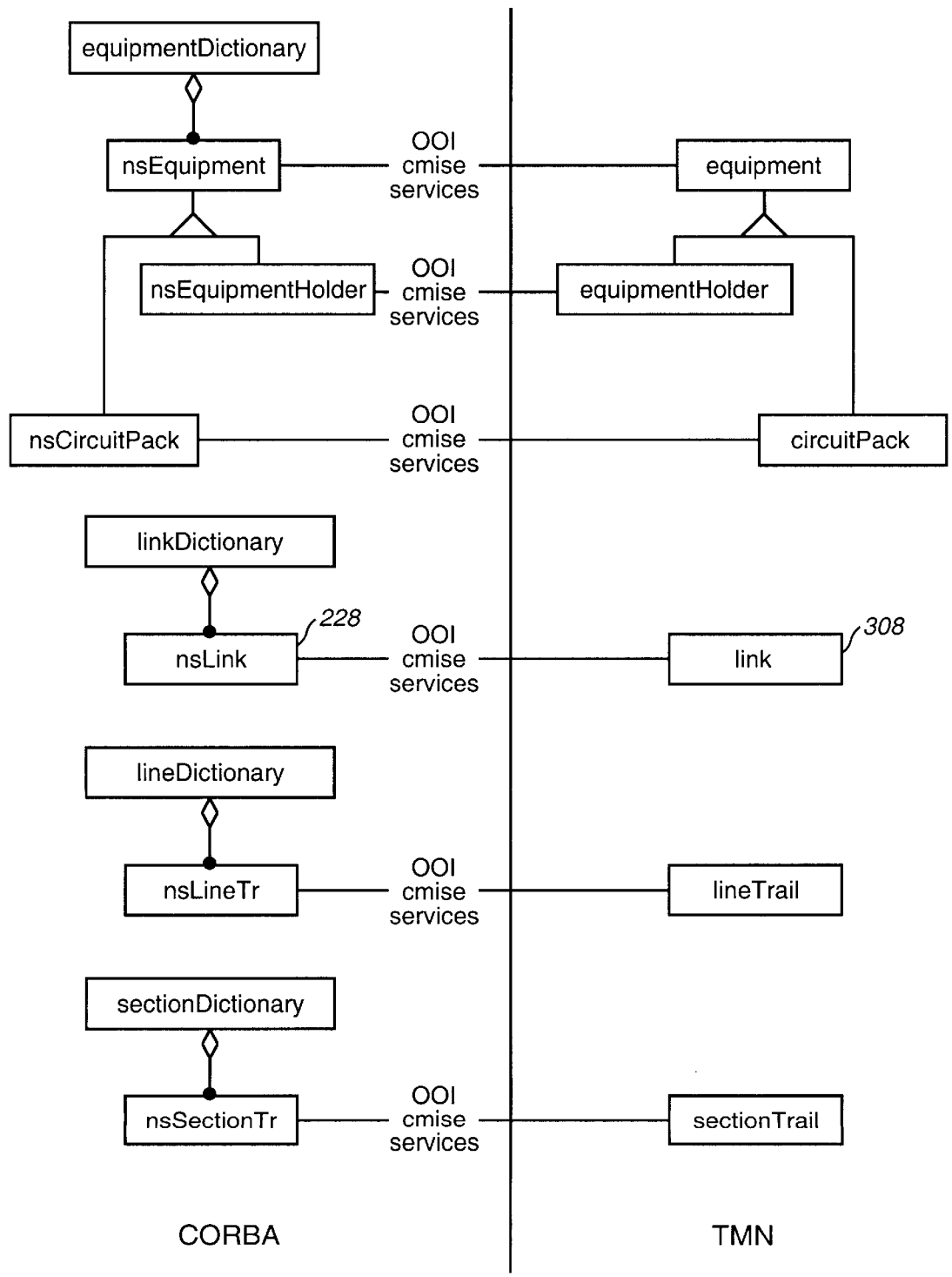

FIGS. 3A–C depict the mapping of relationships between instantiated classes in the CORBA domain and those in the TMN domain. In the preferred embodiment this mapping is performed by the ORB 103.

In FIG. 3A, an instance of the nsTMNOOIThread Class 208 in the CORBA domain establishes and maintains a connection with an OOIProxyAgent class 302 in the TMN domain. The nsTMNOOIThread 208 Class establishes the connection. The nsTMNOOIThread class 208 then maintains a handle that is necessary for subsequent use of the established connection. All subsequent communications between the CORBA object model and the TMN object model are achieved through this connection, and further, must involve an nsTMNOOIThread class 208 function to obtain the correct handle.

A conventional approach for mapping two object class hierarchies to one another is to arrange the two class hierarchies similarly in terms of lineage and functionality. Then each instance of a class in one hierarchy can maintain a pointer to reference its counterpart object in the other hierarchy. For example, in the well-known model-view-controller paradigm, a division is made between classes that represent a data model and classes that are used to graphically render the data model. The data model is a hierarchy of classes that can manipulate data in memory. The view hierarchy contains functions for displaying data. Each model and its corresponding view instance maintain pointers or references to each other. If the data model instance changes state, it calls upon the corresponding view model instance to change its graphical appearance. If a user acts upon the graphical representation, the view instance may notify the data model to change its state. If a user simply moves the graphical representation without otherwise altering its state, then the view instance can operate without calling any functions in the corresponding data instance.

Thus, to map a TMN-compliant object model to a CORBA-compliant object model, the conventional approach teaches building a CORBA class hierarchy in the same fashion as the established TMN class hierarchy. Then provision is made for each CORBA object to maintain a reference to its counterpart in the TMN object model. Referring to FIGS. 3B and 3C, many of the CORBA objects depicted therein accomplish the reference by containing a distinguished name for their TMN counterpart. Normally, a function invoked within a CORBA object would simply involve calling a similar function in the corresponding TMN object that is identified by the distinguished name. Passing a TMN distinguished name allows the TMN domain to readily access the desired object from the function call.

Although the conventional model-view-controller design works well for some object mappings, other object mappings are best accommodated by a different scheme. The present invention realizes several advantages by teaching novel approaches to mapping from object domain to another.

One novel approach to mapping is the use of a dictionary class in the CORBA-domain. This is illustrated in FIG. 3A. For example, the nsNetworkManager class 238 contains exactly one locationDictionary class 304. The locationDictionary class 304 contains a list of entries. Each entry matches a TMN object's distinguished name with a pointer to a CORBA-domain object. The entries can be retrieved by a single function call in the TMN domain. The single function call requests a list of all locations. Upon invoking this single function call, the TMN-compliant object model searches through all the objects in a TMN-compliant object models hierarchy to derive and return the requested list. The other dictionary classes illustrated in the CORBA-compliant model are populated by a similar procedure.

The use of a dictionary class on the CORBA side provides practical advantages in performance and flexibility. For example, in many cases an activity on the CORBA-compliant object model is directed at a subset of all the locations. By using a CORBA domain dictionary to "shadow" the TMN list of locations, a query function on the CORBA domain side can effectively derive a subset of locations from the locationDictionary class 304. Having done so, further processing on the CORBA side can then extract the distinguished name for each entry. Then, appropriate TMN calls are made by passing the extracted distinguished name to the TMN side. This method can be considerably faster than determining the locations subset on the TMN side. An additional advantage in this approach is that a workstation developer who must interface with the CORBA-compliant object model is not burdened with having to understand or write instructions to iterate through the TMN-compliant objects.

A further advantage of this approach is that some function applied to objects on the CORBA domain side should not be allowed to affect a similar function upon corresponding objects on the TMN domain side. For example, it is desirable that a "create" or "delete" function on the CORBA domain side cause local creation or deletion of CORBA objects, but not have an equivalent effect on the TMN domain side.

Another novel approach in the CORBA-TMN mapping of the present invention is that the CORBA-compliant object model classes do not have a hierarchy that mirrors the TMN-compliant object model hierarchy. Instead, the CORBA-compliant object model classes are granular enough to conform to the TMN-compliant object model. Thus, if a TMN-compliant object model changes, the CORBA-compliant object model can continue to operate without being redesigned. This overcomes a problem with the conventional model-view approach wherein changes in the TMN-compliant object model class hierarchy would often require rearranging the corresponding CORBA-compliant object model hierarchy.

Referring back to FIG. 1, the TMN subsystem 104 is an object-oriented processing environment for monitoring and managing a network. The TMN subsystem 104 consists of a TMN domain 116 and a workset manager 114. The TMN domain 116 can receive event notifications, such as alarm indications, directly from managed NEs via the DCN 127. The TMN domain 116 can also request information from remote NEs. These functions allow the TMN domain 116 to maintain an accurate representation of the configuration and state of the managed network 150.

The workset manager 114 coordinates the storage and retrieval of worksets from a database 120. A workset is a set of data that is used to create a TMN-object model of the managed network as it currently exists and/or of the managed network as it is projected to exist at a particular date in the future.

In general, the database 120 stores numerous records 136 relating to the current state and topology of the managed network. This information allows the network management architecture 100 to create a "current" view of the network. A "current" view model represents the network as it is currently configured.

In the preferred embodiment, the records 136 can also store information relating to future projections of topology, equipments, and configurations within the managed network. Such information allows the network management architecture 100 to create "future" views of the managed network for a user. A "future" view model represents the network as it is projected to exist at some future date.

"Future" views can be used to simulate a variety of modifications to the "current" view including the addition of equipment to and the deletion of equipment from the telecommunications network, and modifications of the configuration of existing network equipment. For example, to create "future" view for the addition of a new piece of equipment to the telecommunications network model, the network designer creates a new record in the database 120 describing the equipment. The workset manager 114 can then use the new record to create a workset incorporating the new equipment model into the network model. The network designer can then simulate network operation to determine the effect of the modification on the telecommunications network 150 model without having to physically modify the telecommunications network 150.

The records 136, stored in the database 120, can be added or modified automatically by the network management system. Alternatively, the records 136 can be created or modified by a human network design engineer who has specific knowledge about current or planned aspects of the managed network. All accesses to the database 120 are performed through a single set of database procedures 118. The database procedures 118 mediate accesses to the data. The database procedures 118 also assure integrity of the database 120. Thus, the workset manager 114 interfaces to the database 120 through the database procedures 118 via a standard database query format. Such a database query format, for example, is the well-known structured query language (SQL).

The workset manager directs the compilation of worksets 138 in accordance with information contained in the records 136. In a preferred embodiment, each workset 138 is a culmination of all database records that describe the network up to and including a particular date. For this reason, unique worksets 138 are indexed by the date to which they pertain.

The TMN domain 116, the workset manager 114, the database procedures 118, and the database 120 are considered to be part of the "network management layer" (NML). The NML is defined in the TMN standard.

In addition to the NEWS 101, other management systems or workstations 140 can use these same components of the NML. For example, a network provisioning workstation (NPWS) 107 can be coupled to the database procedures 118 to provide access to the database 120. In a preferred embodiment, the NPWS 107 accesses the database 120 to assign network traffic to available paths within the managed network 150. The other workstations 140 can access the database procedures through an interface 142. In the preferred embodiment, the interface 142 is implemented using the well-known SQLNET by Oracle Corp. In an alternative preferred embodiment, the interface 142 is implemented using the well-known standard database access control language (DBACL). Alternatively, a Hyper-Text Markup Language translator 141 can convert the database procedures interface into a well-known Hyper-Text Markup Language (HTML) interface 144. Using the HTML interface 144 remote, low-cost workstations, such as workstation 143, can gain at least limited access to data relating to the managed network 150. In TMN terminology, the other workstations 140 and 143, and the NPWS 107 are considered to be part of the "service management layer" (SML). The SML is defined in the TMN standard.

The TMN domain 116 also contains a management information base (MIB) 117. Although there are several possible MIBs in a system designed according to a TMN standard, the particular MIB 117 of interest is a run-time TMN object model. The workset manager 114 creates the run-time TMN object model from a particular workset 138. Thus, the MIB 117 is a TMN object model, extended as described above, that can represent either a "current" view or a "future" view of the managed network 150. The MIB 117 is specifically used by the NEWS 101.

To accomplish some desired network management functions, various workstations would normally access the TMN domain 116, and perhaps the MIB 117, through either a CMIP-compliant interface 142 or a TMN Object-Oriented Interface (TMN-OOI) 105. These interfaces require that the workstations be equipped with specific hardware, software, or operating systems that may incur expenses or inconvenience. In addition, any workstations that use the TMN-OOI must maintain version compatibility with the particular TMN domain 116.

The network management architecture 100 described above, however, provides increased flexibility over existing systems because is allows access to the run-time TMN model of the network by platforms that are not TMN-compliant. For example, the ORB 103 can communicate with non-TMN compliant systems. In such a case, the ORB 103 must include mappings from the TMN-compliant domain to the non-TMN-compliant domain. In the preferred embodiment, the non-TMN-compliant domain is the CORBA domain. Moreover, the workset manager 114 can be modified to allow access to legacy systems. Legacy systems are generally considered to be existing systems that do not support industry standard client interfaces such as CMIP, CORBA, or SQL interfaces. Legacy systems include many traditional mainframe applications as well as midrange and personal computer applications.

Figure 1B:
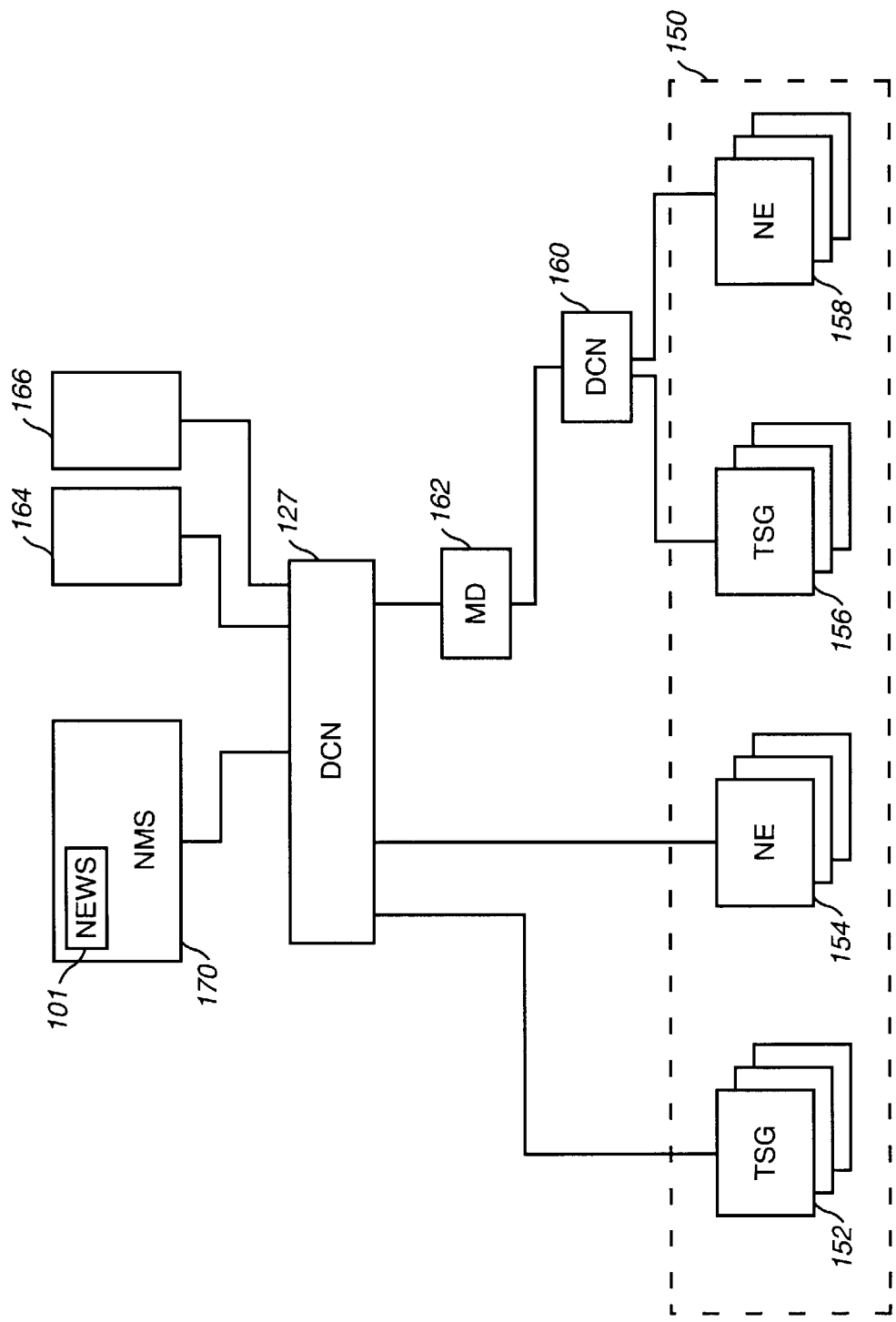
FIG. 1B is a network management system illustrated according to the TMN standard.

FIG. 1B illustrates the structure of the NEWS 101 as an operations system as defined by the TMN standard. Referring to FIG. 1B a network 150 to be managed is represented as groups of timing signal generators (TSGs) 152, 156 and groups of network elements (NEs) 154, 158. TSGs and NEs are discussed below. The TSGs 152 and NEs 154 are directly connected to a data communications network (DCN) 127. A network management system (NMS) 170 according to the preferred embodiment of the present invention is also shown connected to the DCN 127. The managed network components can interface to the NMS 170 by using a standardized data communications protocol, such as a CMIP-compliant protocol (as described above). In the preferred embodiment, the NEWS 101 is implemented in the NMS 170. Other operations systems 164, 166 are also shown connected to the DCN 127. The other operations systems 164, 166 can also communicate with the managed network elements in a similar manner as the NMS 170.

Within the managed network 150, other groups of TSGs 156 and NEs 158 are connected to a separate DCN 160. The DCN 160 is connected through a mediation device 162 to the DCN 127. This indirect connection of the TSGs 156 and NEs 158 to the DCN 127 can be used where the TSGs 156 and NEs 158 are not equipped to communicate using the same protocols as the NMS 170. In such a case, the mediation device 162 translates among protocols, thereby allowing diverse equipments to communicate with the NMS 170. As would be apparent to those skilled in the art, another practical reason for using the indirect connection is to provide coverage for a large number of elements over shared communications facilities.

The network management architecture 100 was described in terms of coupling through DCNs. A DCN provides a mechanism for transmitting information between two remote points. In the context of the present invention, the DCN can be either a network or a single conduit. For example, in the case of the DCN 127, if a particular NE is CMIP-compliant, then the DCN 127 with respect to that particular NE can be simply a direct coupling. Although there are several separate DCNs depicted in FIGS. 1A and 1B, it would be apparent to those skilled in the art that some of the DCNs can overlap or be combined. In a DCN that uses a multi-layer protocol, even the diverse interfaces shown can be implemented through the same physical network for practical reasons.

II. Human-Machine Interface (HMI)

Figure 4:
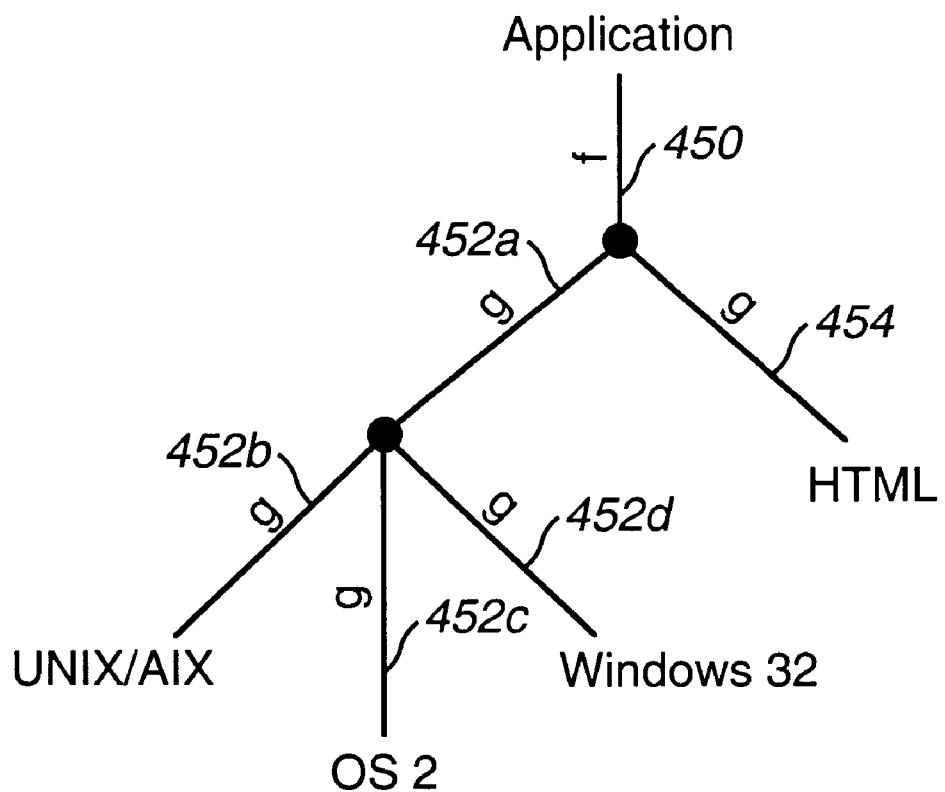
FIG. 4 is a diagram of interfaces according to a preferred embodiment of the present invention.

The human-machine interface (HMI) of the present invention is unique in the field of telecommunications network synchronization management. Referring to FIG. 4, the HMI of the present invention is described. In the HMI of the present invention, an application, such as the WSF 102, communicates with the remainder of the system over an "f" interface 450. An "f" interface is standard TMN terminology for a common interface to attach to a particular application. CORBA-compliant interface 113 is an example of an "f" interface. The "f" interface 450, in turn, connects to various support platforms via "g" interfaces 452a–d and 454. A "g" interface is standard TMN terminology for a graphical interface. GUI 108 is an example of a "g" interface.

In the present invention, there are preferably two broad classes of "g" interfaces. The first class of "g" interfaces includes "g" interface 452a, which can be further divided into "g" interfaces 452b–d (described below). The "g" interfaces 452b–d connect a particular application to high-end and midrange user platforms. The second broad class of "g" interfaces is "g" interface 454. The "g" interface 454 connects a particular application to low-end user platforms using the well-known Hyper Text Markup Language (HTML).

For example, the "g" interface 452*b* can be connected to a high-end user platform that supports the well-known UNIX/AIX operating system. Such a high-end user platform can be, for example, a high-end workstation that is capable of running the WSF 102 at or near real-time. Such capability can be required by a network design engineer responsible for designing and maintaining the telecommunications network. The high-end system is relatively expensive.

The "g" interfaces 452*c–d* can be, for example, connected to a mid-range user platform. Such a platform can be capable of supporting the well-known known OS2 or Windows 32-bit operating systems. In the present invention, the mid-range user platform is used by a user that requires frequent access to the simulation capabilities of the present invention, but does not require the power of a high-end user platform. For example, a mid-range computer platform could interface to the network management architecture 100 through the CORBA-compliant interface 130.

The "g" interface 454 provides an inexpensive mechanism for widespread distribution of the services provided by the present invention. This is because the user platform supporting the "g" interface 454 does not have to support executing the application and the associated computing requirements. Users of such a low-end platform include remote users that require infrequent access to the telecommunications network models stored in the object stores in the database 120. The low-end user platform preferably accesses a particular application using the well-known HTML. Referring to FIG. 1, interface 144 provides an HTML interface to the telecommunications network models stored in the database 120. As a result, low-end user platforms are less costly and more easily supported than high-end and mid-range user platforms.

In the preferred embodiment, the HTML interface is generated by an HTML translator 141. The HTML translator 141 preferably has a browser (e.g. the well-known Netscape Browser) for providing a GUI for a low-end user. The advantage of using the aforementioned distributive processing mechanism offered by the "g" interface 454 is the reduced cost and complexity of the low-end user platform.

III. GUI

The GUI 108 provides the graphical interface to the telecommunications network object models stored in the database 120. A number of features have been incorporated in the GUI 108 to improve its presentation and overall usefulness to network designers and maintainers.

One feature is the presentation of object-oriented linked topological and topographical views of the telecommunications network. The linked topological and topographical views are useful for determining diversity in the telecommunications network. Moreover, the linked topological and topographical views can be used to verify that a particular restoration configuration satisfies various engineering guidelines.

Figure 5A:
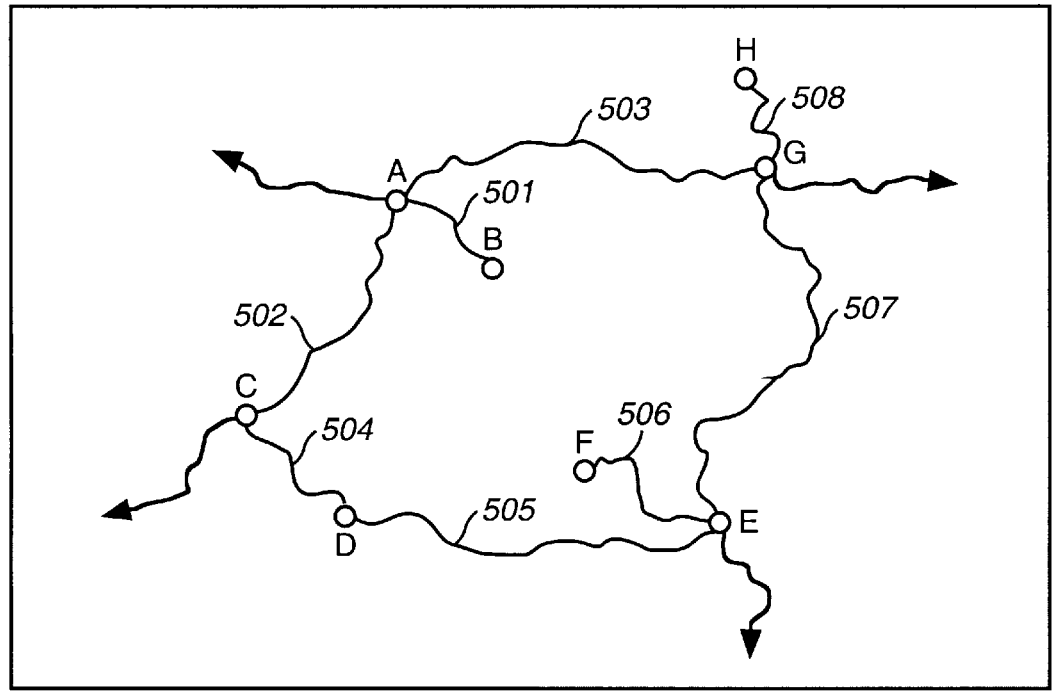
FIGS. 5A–D illustrate linked topological and topographical network views.

FIGS. 5A–D illustrate the linked topographical and topological views. FIGS. 5A–D illustrate a telecommunications network having 8 interconnected sites A–G. FIG. 5A illustrates a topographical view. In the FIGS. 5A–D there are three general classes of sites. Source sites are sources of communications. Sink sites are users of communications. Intervening sites are used to provide connectivity between source and sink sites. For example, to transmit a communication from site A to site H, the communications must pass through site G. Thus, site A is the source site, site H is the sink site, and site G is the intervening site. As described above, the path information is contained in the extensions to the standard TMN model according to the preferred embodiment.

As can be seen in FIG. 5A, the topographical view presents the physical interconnectivity between the sites A–G. For example, there is a physical link 501 that connects sites A and B. Likewise, there is a physical link 502 that connects sites A and C. While, FIG. 5A presents the physical configuration of the sites A–G in the telecommunications network, FIG. 5A does not illustrate the logical connections between the sites, that is what sites are actually configured to communicate with one another.

Figure 5B:
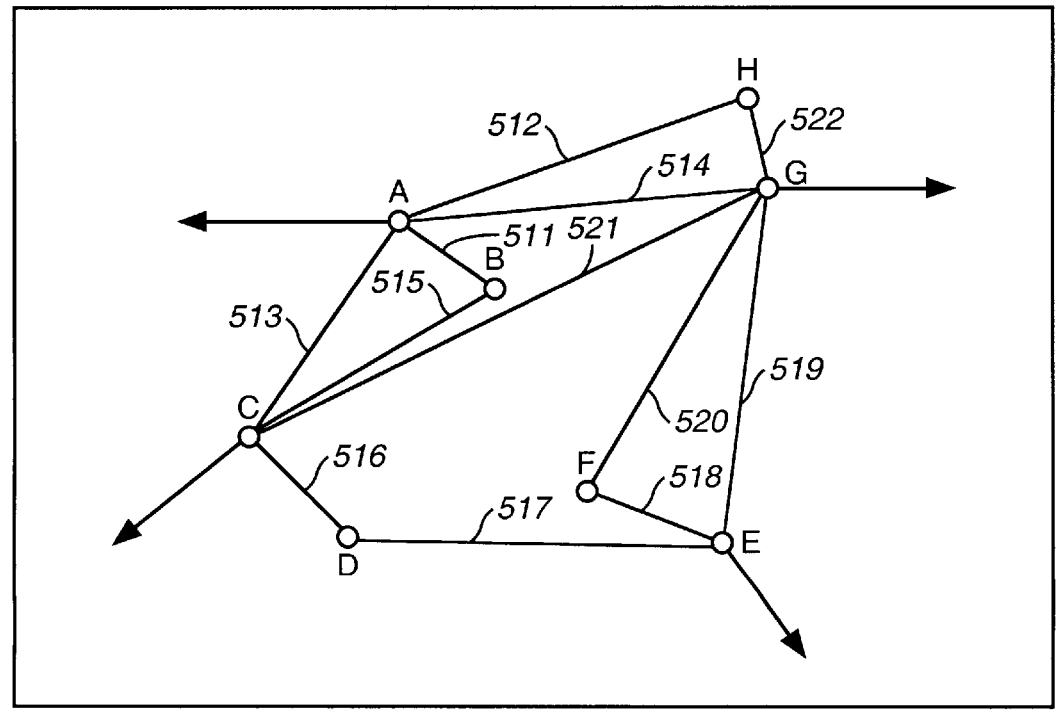

FIG. 5B illustrates a topological view of the sites A–G in the telecommunications network. The topological view provides a view of the logical connections among the sites A–G. That is, the topological view illustrates the connections between sites according to the object models stored in the database 120. The topological view is possible due to the connectivity extensions to the TMN standard discussed above. Note that the topological view indicates a logical link 512 between sites A and H. According to FIG. 5A there is no physical link between sites A and H. Therefore, assuming no errors, there must be an intervening sites to make the connection between sites A and H. In this example, site G is the intervening site. Thus, the logical connection 512 includes physical links 503 and 508.

Figures 5C, 5D:
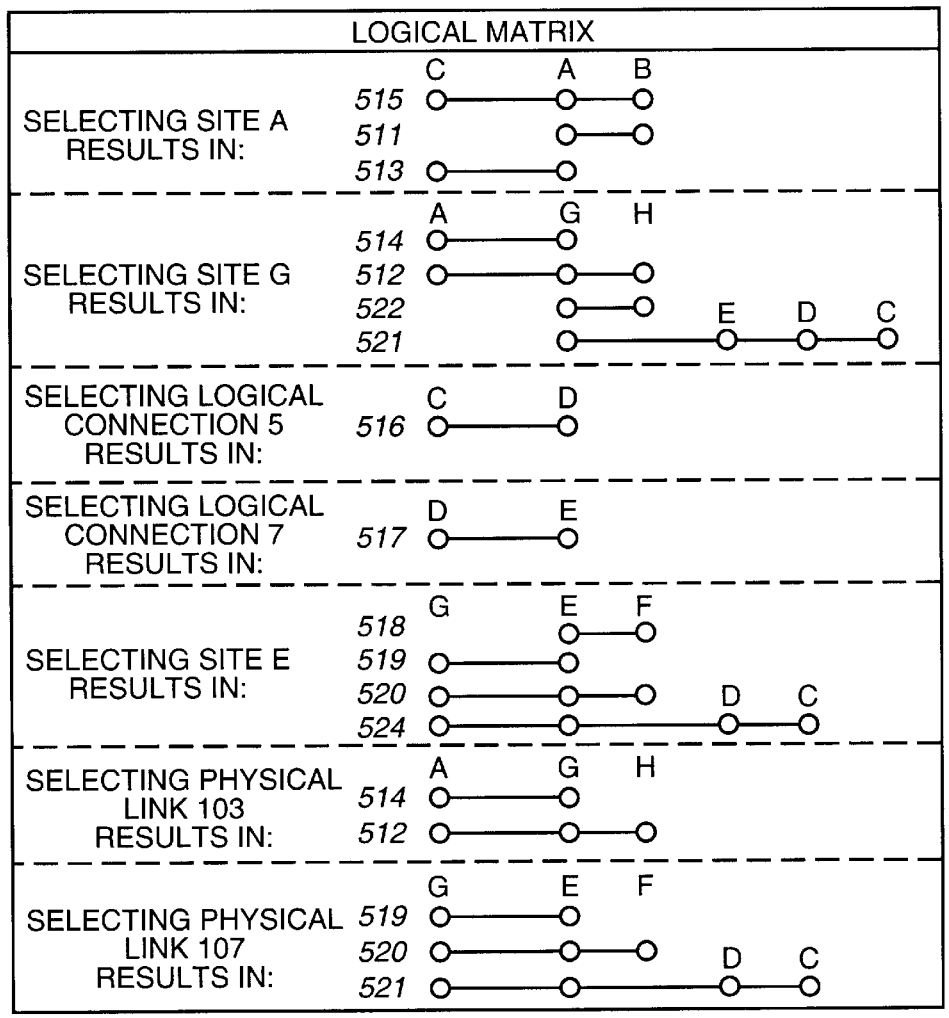

The present invention includes a third view, the logical view. The logical view of the telecommunications network illustrates interconnectivity between particular portion of the network. For example, in the preferred embodiment, the logical view of the telecommunications network illustrates the connectivity for a particular site, logical link, and/or physical link of the network. In the preferred embodiment, the user selects the portion of the telecommunications network for which a logical view is displayed using a selection device, e.g., a well-known computer mouse. Upon the user's selection, a display, as illustrated in FIG. 5C, is presented. Using the logical view of the network, a user can readily determine the logical connectivity of a particular portion of the telecommunications network.

FIG. 5D illustrates a reference table that stores associations of sink, source, and intervening sites. The reference table can be stored in memory. The reference table provides a convenient storage format for the connectivity of the telecommunications network. The reference table is optional because all of the required information is incorporated in the records 136 in the database 120.

Errors can occur if changes are made to the physical configuration of the network without corresponding updates made to the database. For example, the database can indicate that there is no connection between two sites. However, the MIB 117 can indicate that the physical network indicates that such a connection exists. In the preferred embodiment, the physical network is taken as the true representation. In the preferred embodiment, a consistency check can be performed to determine is the MIB 117 differs from the database 120. The consistency check can be automatic or manually invoked. Any differences between the MIB 117 and the worksets in the database 120 are resolved in favor of the MIB 117.

As discussed above, the multiple views provided by the GUI facilitate network restoration and diversity assurance. Restoration refers to repairing failed network services. Using the various views provided by the present invention, the network designer can predict where proposed implementations of the telecommunications network are likely to fail. The designer can also monitor self-restoration capabilities of the telecommunications network. In the preferred embodiment, the topological and topographical views highlight failed portions of the network. This is described in more detail below.

The multiple views also facilitate meeting any diversity requirements imposed by network design protocols. Diversity refers to providing more than one path of communication between two sites while minimizing the number of common elements in the paths. By doing so, the network can restore itself in the event of a failure in one of the paths by switching in one of the other paths. Using the selection feature, a network designer can view the connectivity of any portion of the network as illustrated in FIG. 5C. The designer can then determine if diversity requirements are met.

Due to the complexity of network topology, the user views can become cluttered. This results from the limited size and resolution of the display devices on which the user views are displayed. The GUI 108 of the present invention provides additional features to reduce the clutter on the screen.

One method for reducing the clutter is that the GUI 108 allows the user to zoom in or zoom out in the network view. The zoom in provides more detail to the network engineer. The zoom out allows the network engineer to see more of the network, but in reduced detail. In a preferred embodiment, the zoom level is automatic. Moreover, the detail illustrated in the zoomed view is adjusted dependent on the zoom level.

The GUI 108 also provides scalable icons. The scalable icons represent various sites or equipments in the telecommunications network. The present invention scales the icons as the network engineer zooms in (more detailed view of the network) or zooms out (less detailed view of the network) when displaying the network. In this manner, the scalable icons retain their relative size to the network portion displayed on the network engineer's screen. This alleviates the problem of icon growth or shrinkage as the network engineer zooms in or out when displaying various portions of the network.

The GUI 108 also contains a "cluster controller." The "cluster controller" determines whether too many network elements are overlapped, thereby presenting a confusing display to the network engineer. If such a condition is detected, the "cluster controller" groups the overlapping network elements together. The "cluster controller" then represents the grouping as a "cluster element" on the network engineer's display screen. The screen provides an indicator that a given element is a "cluster element." The network engineer can zoom in on a "cluster element" to see the detail contained therein.

The "cluster controller" function can be automatic. That is, the system can determine whether too many elements are overlapped. If the system determines that too many elements are overlapped, it automatically creates a "cluster element" of the overlapped network elements. The determination can be based on a default value or a user selectable overlap factor.

The "cluster controller" function can also be manual. That is, the network engineer can select an area of the network to reduce to a scalable icon. Any network elements falling within the selected area are grouped together and represented by a "cluster element."

The GUI 108 also includes "pseudo-points" on a line. Due to the limited resolution and size of the display device, lines, representing separate conduits in a network, may appear so closely on the display device that they appear to form a common conduit. "Pseudo points" allow a line to be represented by a point, having no significance to the network, other than to move the line to make it more distinct. Thus, the "pseudo points" can be used to redraw the line for clarity, while identifying the true path of the line.

The present invention also employs an alarm focus mechanism in the GUI 108. When an alarm is generated by the telecommunications network being managed, the system determines the area of the network that is affected. If a portion of the physical network has failed, the failed portion can be determined by communication with the physical network through the CMIP interface 121. If a simulation (e.g., "future" view) indicates a failure, the simulation indicates which part of the network has failed.

The affected regions of the telecommunications network are automatically displayed to a network engineer on the GUI 108. That is, the present invention provides a zoomed in display scoped to the affected region of the network. Moreover, the affected region is indicated on the overall network display by a small "reference window" outlining the affected region of the network.

The same mechanism for displaying affected regions of the network is applied on a project basis against the workset manager 114. With respect to each project, the affected region of the network is displayed to the network engineer on the GUI 108. Thus, if a change in one region affects another region, the network engineer sees all regions affected. In this manner, the present invention makes a network engineer aware of which parts of the telecommunications network a proposed design will affect.

IV. Network Management Functions and Performance Metrics

Another aspect of the present invention is the performance of network management functions. One such network management function is designing synchronization distribution in a telecommunications network. Designing synchronization distribution according to a preferred embodiment of the present invention assures that a particular network configuration satisfies various engineering guidelines. Such guidelines include elimination of loops, traceability assurance, diversity assurance. A network loop is a connection of network equipments having the same starting and ending piece of equipment. Loop detection refers to determining the occurrence of a unique piece of network equipment more than once in a network path. Traceability requires that a particular destination of synchronization be traceable to a Stratum-1 source. Diversity refers to the ability of the network to route communications signals across multiple paths having the same source and destination, such that the number of common elements between diverse paths is minimized.

Moreover, the present invention calculates metrics to aid in performing the design functions. As described below, a Q-metric is cumulative quality metric that indicates the quality of communication for a given path in a network. The Q-metric depends on the physical characteristics of equipments in the path.

Although described below in the context of network synchronization management, it would be apparent to those skilled in the art that the management functions and performance metrics are applicable to management of a telecommunications network in general. For example, diversity considerations can be used in any network requiring alternate destination paths to improve the robustness of the network's ability to restore itself. Likewise, the Q-metric can be used to calculate a particular path's communications quality in any network model. In the context of network synchronization management, a communication signal is a synchronization signal or timing signal.

As described above, the present invention allows the performance of a management function for managing the synchronization distribution in a telecommunications network to assure that certain engineering guidelines are satisfied.

One engineering guideline is to provide a loop-free network topology. Loops occur when a particular destination network element becomes its own source, usually as a result of topology change. This can be detrimental to network performance. For example, in network synchronization significant degradation of network performance is likely to result if a synchronization signal destination clock is the same as the synchronization signal source clock. This is because the synchronization signal destination clock will attempt to align to the phase of its source, thereby modifying its output. This is reflected back at the input, resulting in additional, cumulative attempts to align its phase until significant deviation in output frequency occurs. The frequency deviation causes degraded service and eventually failure of the synchronized components in the network. To prevent such occurrences, the present invention provides the capability for the loop detection in a telecommunications network.

Loop detection analysis comprises tracing a communication signal distribution to determine whether a particular network element is using its own output signal as a reference input. If a particular element uses its own output as a reference input, then there is a loop, and the network engineer is alerted to its presence.

Network elements can be tagged with a unique identification number in a well-known manner. Thus, the loop detection process traces a network communication path to determine if a particular identification number appears twice, thereby indicating the presence of a network loop.

In the context of network synchronization management, loop detection is alternately referred to as timing loop detection. When performing timing loop detection, network synchronization elements are analyzed to determine if any loops are present. Network synchronization elements include any network elements responsible for network synchronization. Network synchronization elements, like network elements in general, can be tagged with a unique identification number in a well-known manner.

A second engineering guideline is assuring traceability. Traceability refers to a telecommunication network management system's ability to trace the destination of a communication signal its source. In the preferred embodiment, the engineering guideline for traceability is back to a Stratum-1 source.

In the preferred embodiment, traceability is implemented in the context of network synchronization management. In this context, the communication signal traced is the synchronization signal. In the preferred embodiment, each user of timing must be traceable back to two primary reference sources (PRSs). In the preferred embodiment the PRSs are Stratum-1 references. The system monitors traceability by looking at the synchronization path for a particular user of timing, from the user to its timing source. The preferred embodiment requires at least two paths of PRS traceability to provide redundancy for quicker restoration to Stratum-1 traceability in the event of a failure of a Stratum-1 source connection.

In the preferred embodiment, synchronization network design occurs in three phases: (1) primary traceability to Stratum-1, (2) restoration traceability to Stratum-1, and (3) monitoring. Each PRS is directly, bi-directionally connected to another PRS across the network. These connections provide two functions. In the normal operating mode, each PRS monitors the other for phase and frequency stability. In a degraded mode (e.g., when one of the PRSs loses stability), the monitored connection from the second PRS is used as an alternate reference source to restore traceability to Stratum-1. Both restoration and monitoring are thus accomplished by the same bi-directional connection.

In a similar manner, the synchronization distribution network is designed so that each SRS has reference connections to two different PRSs. The SRS is monitored by at least one other PRS or SRS, generally one of its source PRSs. SRSs can also receive Stratum-1 traceable reference sources from intermediate SRSs, following the general rules for hierarchical distribution and diversity (discussed below). The three design phases for SRSs generally occur sequentially.

Connections used for monitoring need not be diverse from the paths of the reference connections. The monitoring capability allows the network synchronization management system to know the performance of reference connections (the combination of the timing source and SONET connection)

When referenced to the synchronization topology maintained by the synchronization management system, this monitoring performance information is used to identify degrading or failing network components quickly and generate requests for corrective action. These requests may be automated actions taken by the network, notification to support technicians, or both.

Once paths having Stratum-1 traceability have been defined, the network engineer can use the Q-metric (described below) to determine a priority order (described below) for the paths. That is, the network engineer can determine which path is the primary path, and which path is to be used in the event of a failure of the primary path.

A third engineering guideline is providing diversity of network paths. Once the telecommunications network management system has determined all paths between a particular source and destination of timing, it performs a "diversity" analysis. The diversity analysis chooses paths so as to minimize the number of common network elements between them.

A Q-metric is a measure of the quality of a particular path for distributing timing to a particular site. More specifically the Q-metric is a measure of the cumulative phase disruption of intervening network elements in a synchronization path. Without such a metric, a network engineer is left with little more than a guess as to which synchronization path is most probably the best. In the preferred embodiment of the present invention, the Q-metric is modeled as:

$$Q = (q(miles) + q(LRE) + q(Line\ Timed\ Device)) * q(line),$$

where:
- Q is the Q-metric metric,
- q(miles) is an empirically determined value corresponding to the degradation of synchronization per mile of optical fiber,
- q(LRE) is an empirically determined value corresponding to degradation caused by regeneration elements along a synchronization path.
- q(Line Timed Device) is a value corresponding to the accuracy of a timing source, e.g. a timing signal generator, and
- q(line) is an equipment "slack" factor that can be used to account for equipment and manufacturer degradations, e.g., optical aging.

The Q-metric can be derived for any synchronization path in a telecommunication network. A network engineer can use the Q-metric to determine the best path from among several alternatives. Thus, use of the Q-metric prevents the often trial-and-error method of conventional synchronization distribution methods.

The Q-metric has 2 additional uses. The first use is to predict the performance of a particular path in the network. The second use is to compare the predicted performance with actual performance to identify potential problems where failures are likely to occur in the network.

The Q-metric as defined above can be customized. That is, a customer can adjust the various parameters of the Q-metric to account for other network phenomena. For example, the customer can adjust the Q-metric parameters to account for synchronization topology, rather than line, effects.

Diversity considerations have higher priority than Q-metrics. That is, a path having a high Q-metric, but having an unfavorable diversity analysis is not chosen over a path having a lower Q-metric but a favorable diversity analysis. The reason is that diversity is a measure of a telecommunications network's ability to repair itself in the event of a failure or degradation, whereas the Q-metric predicts performance degradation.

V. Synchronization Distribution Management

Because the network management architecture 100 stores a logical representation of the physical network in the MIB 117, the network management architecture 100 contains the information required to perform the management functions and calculate the performance metric discussed above. In the preferred embodiment, the network management architecture 100 is used to manage network synchronization, including timing distribution, timing restoration, and timing modification. As previously described, the network in which the present invention executes has SONET network elements (SNEs), timing signal generators (TSGs), and other network equipments.

Figure 6:
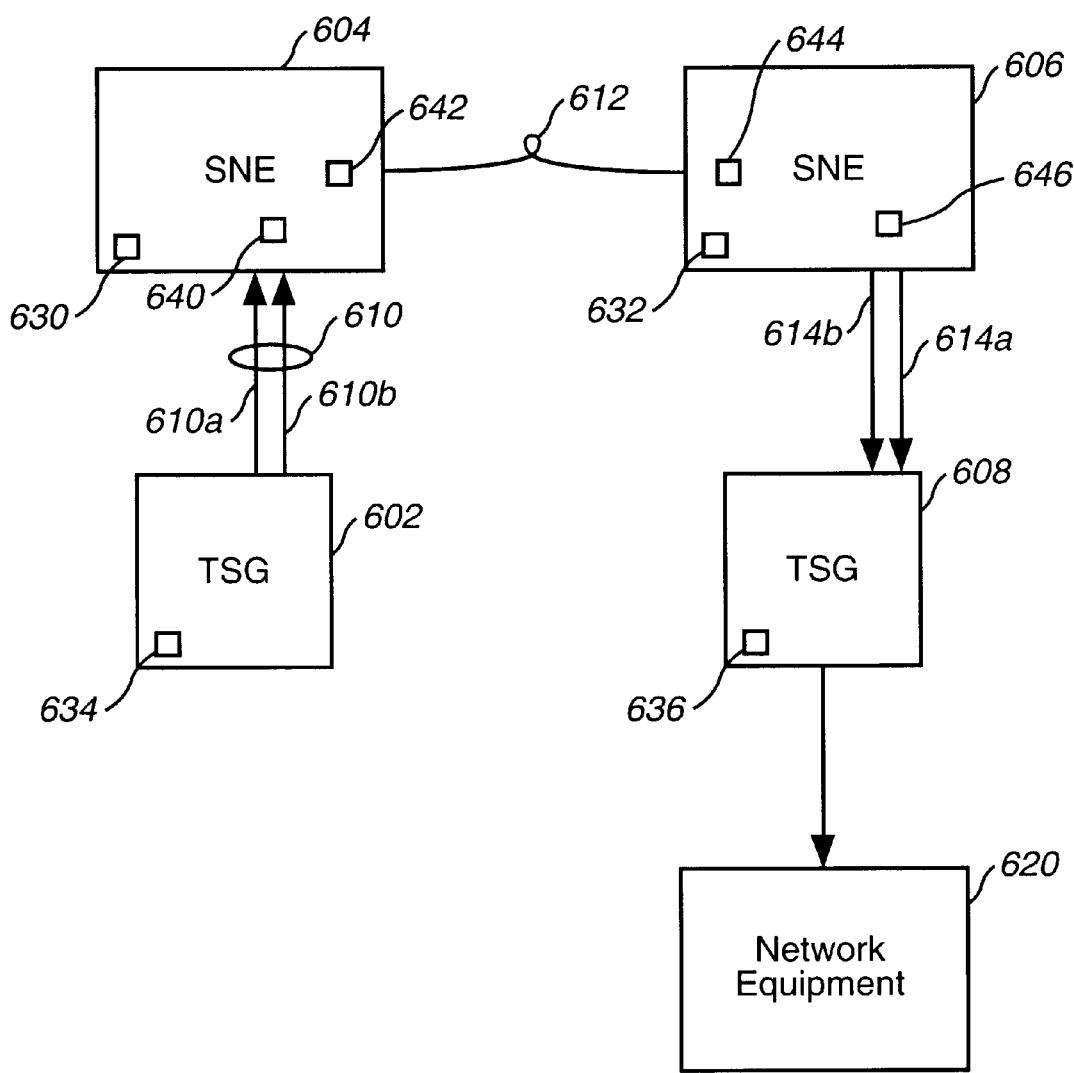
FIG. 6 illustrates a simple timing distribution chain in a telecommunications network.

FIG. 6 illustrates a simple timing distribution chain in a telecommunications network. The timing distribution chain comprises two timing signal generators (TSGs) 602, 608 and two SONET network elements (SNEs) 604, 606. TSG 602 is coupled to SNE 604 via electrical connections 610*a* and 610*b*. In the preferred embodiment, the electrical connections 610*a* and 610*b* form a redundant pair 610. Similarly, TSG 608 is coupled to SNE 606 via electrical connections 614*a* and 614*b*. Electrical connections 614*a* and 614*b* can be a paired connection, but in general are not. The SNEs are optically coupled by at least one optical connection 612. Optical connection 612 can be any optical connection including, for example, fiber optic cable.

The TSGs 602 and 608 provide timing signals to various network equipments, e.g., network equipment 620. Network equipment 620 can be one or more units of telecommunications network equipment that require synchronization. The timing signals produced by TSGs 602 and 608 are electrical signals. In the preferred embodiment, these electrical signals conform to the well-known Digital Signal 1 (DS1) standard. The DS1 standard defines electrical signals having a 1.544 Mbits data rate.

In the preferred embodiment, timing signals are generated by oscillators in the TSGs 602 and 608. The quality, i.e., accuracy, of the timing signals generated by the TSGs 602 and 608 are defined according to Stratum-N standards. For example, TSGs satisfying Stratum-1 requirements have an accuracy of 1e–11 and TSGs satisfying Stratum-2 requirements have an accuracy of 1.6e–8. In the preferred embodiment, TSGs satisfying Stratum-1 requirements are designated primary reference sources (PRSs). TSGs satisfying Stratum-2 requirements are designated secondary reference sources (SRSs). In the preferred embodiment, a PRS provides a reference for SRS timing signal generation. That is a PRS serves as a master clock reference to which an SRS oscillator is locked.

Referring to FIG. 6, distribution of timing in a telecommunications network is explained. TSG 602 generates timing signal conforming to the DS1 standard. The timing signal so generated is to be distributed to the network equipment 620. To carry a timing signal conforming to the DS1 standard, the DS1 timing signal is transmitted to the SNE 604 on lines 610*a* and 610*b* of the redundant pair 610. The SNE 604 chooses one of the DS1s of the redundant pair 610 to transmit to the SNE 606. A selector switch 640 (discussed below with reference to FIG. 7A) selects the DS1 timing signal from line 610*a* or line 610*b*. The timing signal is used to generate the optical carrier rate. The optical signal stability is derived from oscillator 632 in the SNE 604. The oscillator 632 drives an optical frequency generator (not shown). A selector switch 642 (discussed below with reference to FIG. 7B) in the SNE 606 selects the optical transmission path 612. The SNE 606 generates the DS1 timing signal from the incoming optical signal rate. The DS1 timing signal so generated provides a reference to TSG 608. Using this reference, oscillator 636 in TSG 608 generates a timing signal for network equipment 620. In this manner, the timing signal generated in TSG 602 is distributed to the network equipment 620 over the optical connection 612.

Figure 7A:
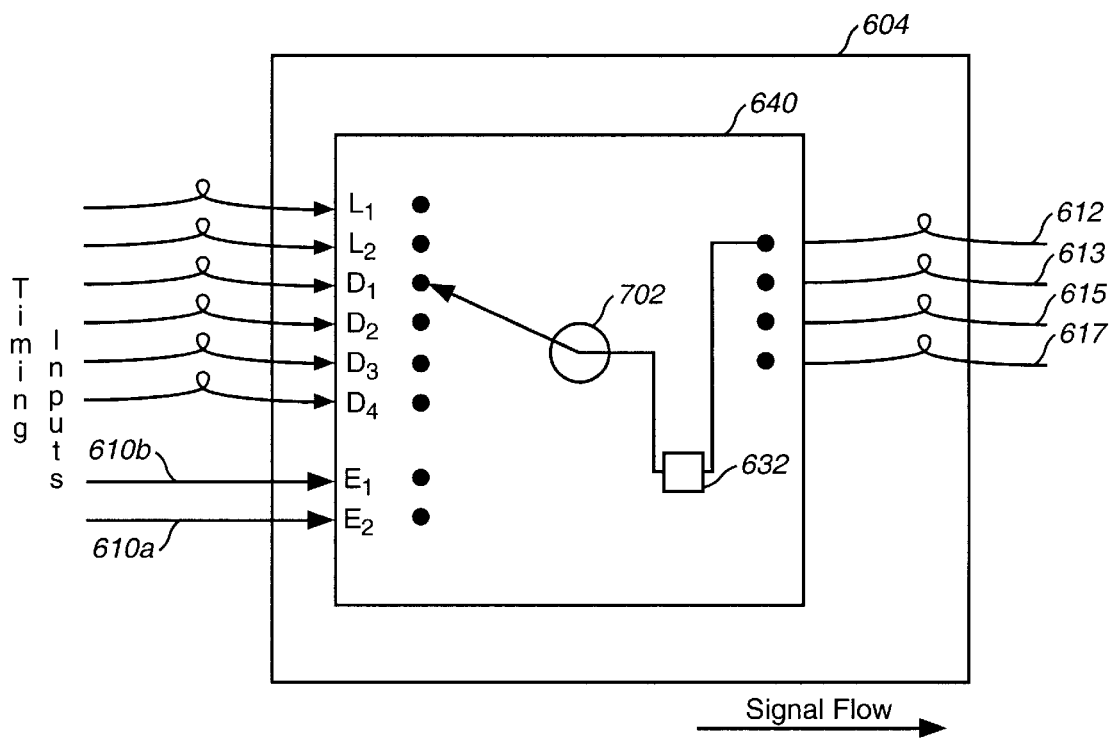
FIGS. 7A and 7B illustrate two types of selector switches 140 and 146 used in SONET network elements.

FIG. 7A illustrates a selector switch 640 in SNE 604. A similar selector switch 644 is located in SNE 606. Selector switches 640 and 644 are used to transmit timing signals over the optical connections 612, 613, 615, and 617. The selector switch chooses one of a plurality of timing inputs to the SNE 606. FIG. 7A illustrates 8 such inputs: 2 electrical DS1 inputs, 2 line side optical inputs and 4 "drop" side (tributary) optical inputs. Line side inputs and drop side inputs are well known in the art. The selector switch 640 includes a selector element 702 that is capable of selecting any of the timing inputs. The output of selector element 702 provides a reference to the oscillator 632. In the preferred embodiment, the oscillator 632 generates the optical frequency for transmission across all optical connections 612, 613, 615, and 617.

Figure 7B:
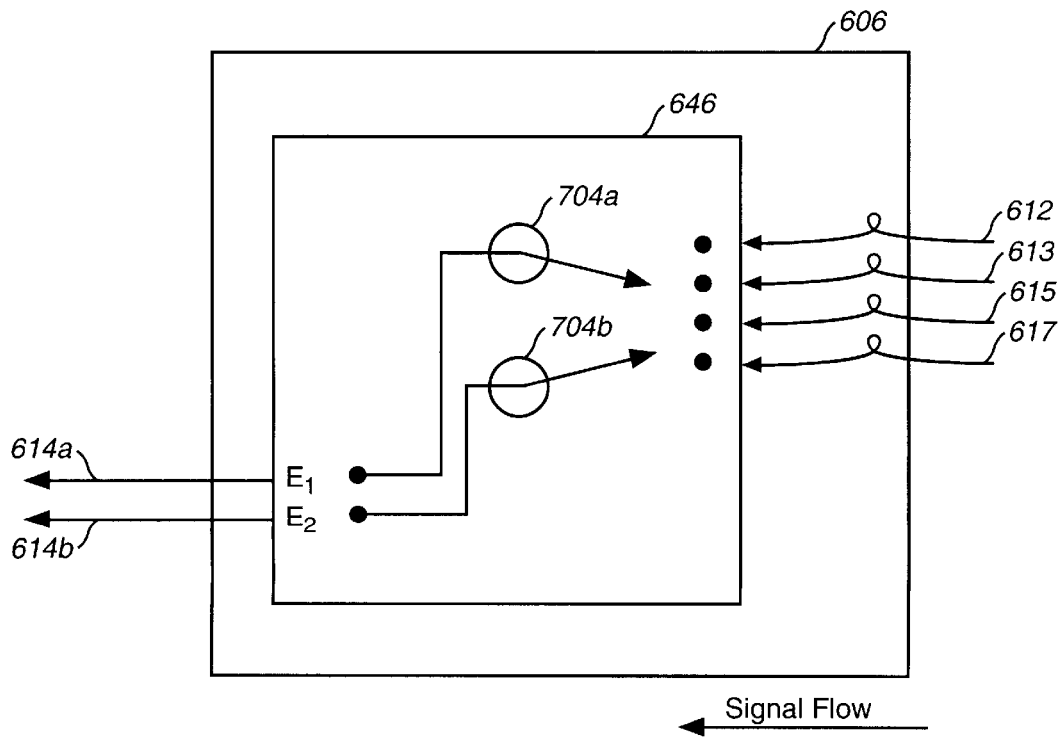

FIG. 7B illustrates selector switch 646 in SNE 606. A similar selector switch 642 is located in SNE 604. Selector switches 642 and 646 are used to receive timing signals from the optical connections 612, 613, 615, and 617. The selector switch 642 preferably includes 2 selector elements 704*a* and 704*b*. The selector elements can independently choose any of the inputs 612, 613, 615, and 617. In the preferred embodiment, a DS1 timing signal is generated from the selected input. In other words, the selector element 704*a* selects an optical input e.g., 612 from which a DS1 timing signal is generated. The electrical signal so generated is output from the SNE 606 on line 614*a*. Likewise, the selector element 704*b* selects an optical input from which a DS1 timing signal is generated. The electrical signal so generated is output from the SNE 606 on line 614*b*.

In general, the selector switch settings are network synchronization topology dependent. That is, there is generally no default state for the selector switches. Thus, the selector switches in an SNE must be set prior to using the SNE to distribute synchronization. The selector switches 640, 642, 644, and 646 can be initialized by a network engineer. For example, in the timing distribution chain illustrated in FIG. 1, the selector switch 640 is initially set to select one of the DS1 electrical inputs 610*a* or 610*b* from TSG 602. Alternatively, the selector switches can be initialized automatically by using a network management system (NMS) (described below).

The selector switches are remotely programmable. The programmable nature of the selector switches provides high flexibility for timing distribution in a telecommunications network. That is during the operation of the telecommunications network, a particular SNE's selector switch set up can be modified. For example, the selector position can be modified to substitute a TSG for a failed TSG to which the selector switch was originally connected.

Each SNE typically includes three or four selector switches, such as selector switches 640 and 642. A telecommunications network can have 6000 to 12000 or more SNEs. It is readily apparent that the combinations of SNEs, each having multiple selector switches, to provide for different timing distribution paths is enormous.

Moreover, the SNEs are generally intelligent equipment. This intelligence enables an SNE to cause the selector to move to a different position in the event of a failure of a network synchronization connection or element. That is, the intelligence allows the SNEs 604 and 606 to reconfigure themselves (i.e., change selector positions according to a predetermined priority) in the event of timing signal failure.

To manage the flexibility inherent in the switching capabilities of the SNEs and TSGs, the management system of the present invention is required. As described above, the present invention models the SNEs and TSGs as object-oriented programming language objects according to the TMN standard. The modeled objects are created from records 136 that are stored in the database 120.

Another aspect of the present invention relates to network restoration management. As described above, SONET equipment generally does not require a separate, dedicated communications line to carry synchronization information from one site to an adjacent site because SONET links carry recoverable timing information as an inherent quality of the transmitted traffic bearing signals. Each SNE requiring timing generally can choose from among several incoming signals (see timing inputs in FIG. 7A) to accomplish synchronization with other timing references in the telecommunications network. A selector switch, such as illustrated in FIG. 7A, is used to select the incoming signal from which to derive timing information.

In sum, a typical network site is connected to many scattered adjacent sites by a multitude of communications links. Each of the links carries a digital signal that can be used as the basis for local timing synchronization. To best assure synchronization across a large network, the timing signal generator within each site should select an incoming signal that has the closest traceability to a PRS somewhere in the network. In the event of a failure affecting the integrity of the selected synchronization path, a given network site must select an alternate synchronization path that is traceable to a PRS.

Furthermore, given two synchronization paths of equal traceability to a PRS, a network site should not switch unnecessarily among the two synchronization sources. This is because every instance of switching entails a risk of generating phase transients which can affect traffic integrity. Such phase transients can be a particularly serious problem because it may affect the timing of numerous outgoing signals to which other sites are phase-locked. A single timing transient, therefore, may ripple and spread throughout the network.

One situation that can give rise to such unnecessary switching is as follows. Within a given network site, a clock selects an incoming signal A from which to derive synchronization. For illustrative purposes, assume that the incoming signal A comes from an SRS (i.e., the incoming signal A is once removed from the network PRS). Then, due to network failure, the incoming signal A is interrupted. The network site clock then picks an alternate incoming signal B upon which to synchronize. While slightly risky (due to the switching from the incoming signal A to the alternate incoming signal B) the switchover from the incoming signal A to the alternate incoming signal B is preferable to allowing the local clock to drift. Thus, the switchover is deemed necessary.

Now assume that the alternate incoming signal B also has second-level traceability, and is essentially equivalent to the incoming signal A. Thus, when the incoming signal A is eventfully restored, the local clock would not benefit by reverting back to the incoming signal A. However, conventional systems, which assign a fixed order of preference among incoming signals, do revert back to the incoming signal A. As a result, conventional systems needlessly risk a phase transient in the network as the timing signal reverts back to the original incoming signal.

Another aspect of the present invention eliminates the risk of a phase transient by using a table of selection priorities contained in each network element that is capable of synchronization switching (i.e., capable of selecting a source of synchronization). In the preferred embodiment, each network equipment that is capable of synchronization switching stores a priority table. The priority table contains priority values that assist in selecting the preferable available incoming signal. The priority values can be assigned so as to prevent unnecessary switching among signals of equal validity and traceability.

Application of the priority tables of the present invention is explained with reference to FIGS. 8A–C. In FIGS. 8A–C, the "E"n are electrical DS1 inputs and the "O"n are optical inputs. Referring to FIG. 8A, a priority table is shown that maps candidate synchronization inputs to an arbitrary assigned priority number. In this discussion, lower priority values indicate greater preference. Greater preference can indicated, for example, closer traceability to a PRS. The candidate inputs in the table of FIG. 8A are analogous to the recovered synchronization signals from the timing inputs in FIG. 7A.

By the assignment of priority values as illustrated in FIG. 8A, an order of preference is established. The order of preference favors switching to source E1 whenever possible. If a failure occurs that renders E1 inaccessible, the source E2 will be selected as the synchronization input. Detecting and locating failures within the network, and communicating the related failure and restoration indications is well-known to those skilled in the art. When E1 is restored, the synchronization input is (immediately) switched back to E1. This characteristic is referred to as "revertive" switching.

FIG. 8B contains a different assignment of priority values to selector switch positions. The different assignment causes a different switching behavior. In particular, the inputs E1 and E2 both have a priority value of zero. According to the priority table in FIG. 8B, if E1 is selected and later fails, switching takes place to select E2 as the alternative synchronization source. In contrast to the priority assignment set forth in FIG. 8A, subsequent restoration of E1 does not trigger a switchover back to E1 from E2. Because E1 and E2 are equally desirable synchronization references, there is no reason to switch unless E2 fails at some later time. In this case E1 and E2 are said to be "non-revertive" with respect to one another.

FIG. 8C illustrates a further variation using the priority tables to control topology. The priority assignment in the priority table of FIG. 8C shows that (a) order of priority is independent of the input designator, (b) any arrangement of priorities can be assigned, and (c) any number of non-revertive strata can be established by the proper assignment of priority values in the priority table. Using the table illustrated in FIG. 8C, if inputs E1, E2, O1, and O2 are unavailable, then the synchronization input is O3. If input O2 is then restored, no switching occurs because O2 and O3 are non-revertive with respect to one another in the table of FIG. 8C. If either E1 or E2 is restored, then switching takes place from O3 to E1 or E2, depending upon which of E1 and E2 is restored first. If all four of the original failures (E1, E2, O1, and O2) are suddenly restored simultaneously, the input O1 is immediately selected as the input synchronization source.

It would be apparent to those skilled in the art that the table entries can take the form of hard-wired logic, read-only-memory (ROM) contents, or writable memory or storage data contents downloaded or asserted by an external network control element. Furthermore, the priority table contents can be altered or otherwise modulated or interpreted according to signals traversing the inter-site links themselves.

Figure 9A:
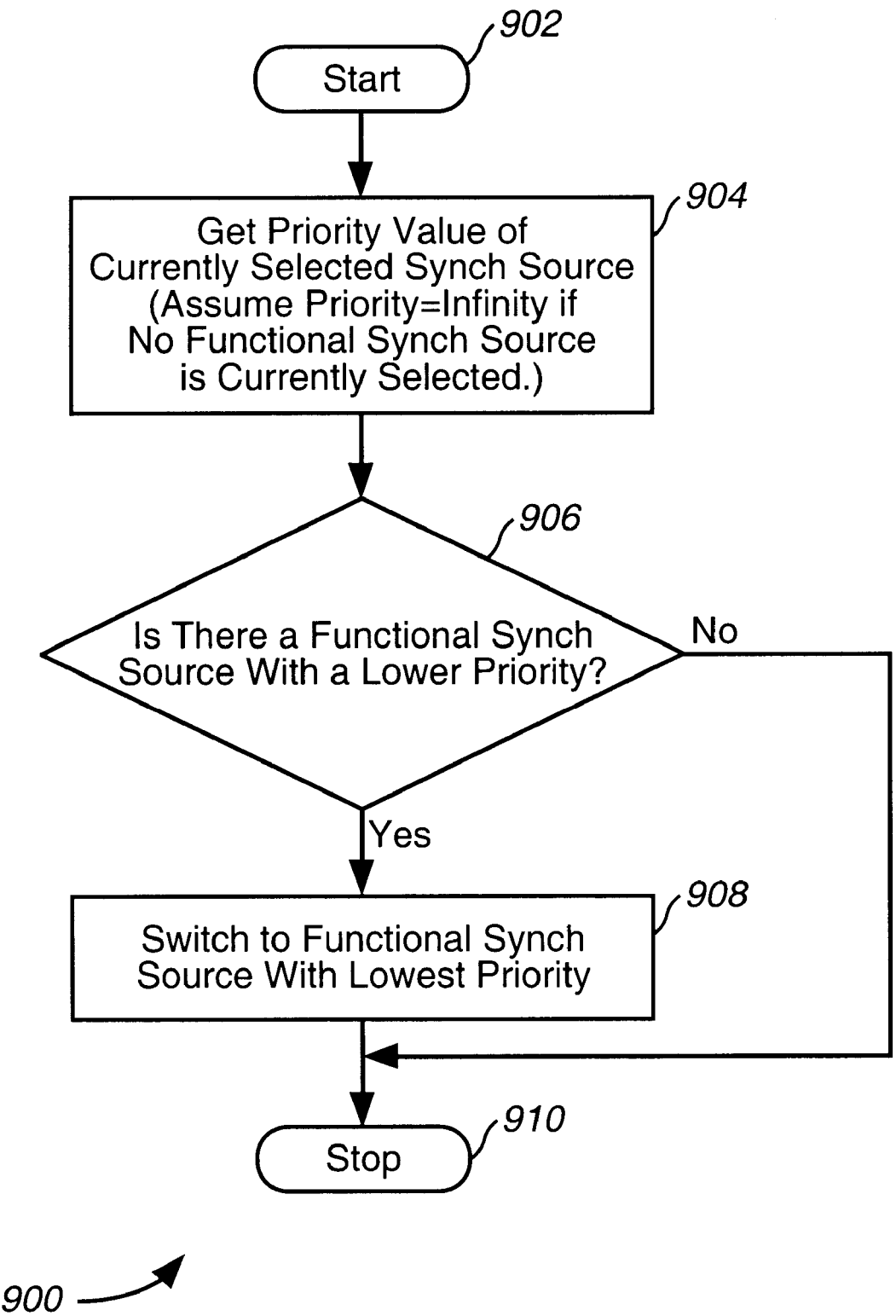
FIG. 9A is a flowchart for interpreting a selection table containing priority values.

FIG. 9A is a flowchart 900 for interpreting the priority table to accomplish the foregoing logical functions in accordance with the preferred embodiment. A process according to the flowchart 900 can be used to control the input selector switch 702 in FIG. 7A.

The interpreting process of the flowchart 900 begins in step 902. In step 902, the process performs a single examination of the functional status of the inputs. Based on the examination, the process makes a decision as to which input should be selected. This process can be triggered periodically to accomplish polling mode operation.

In step 904, the process identifies which of the inputs is currently selected as the synchronization source. Using the priority table, the process also determines the priority value associated with the currently selected input.

In step 906, all properly functioning inputs are reviewed to assess whether any candidate input has a lower priority value than the currently selected input. If a candidate input is found which is functioning properly and has a lower priority value than the currently selected input. Otherwise, if in step 906, no other functioning inputs are found to have lower priority than the currently selected input, the process continues in step 910. In step 910 the process terminates without initiating any switching action.

While the priority assignment aspect of the present invention has been described in the context of directing synchronization selections within network sites, the priority assignment feature is applicable to a variety of similar problems elsewhere in communications network control and in other fields.

For example, a common problem often encountered is that there are several data streams that need to be communicated over a finite number of available paths. Assume that each data stream totally consumes a single path. Also assume that, for robustness, there are a more paths than data streams. Thus, there are spares that can be used if other paths fail. The paths can be assigned as resources according to, for example, the priority assignment scheme in FIG. 8C. Each path, therefore is mapped to a corresponding priority value. The availability indicator for each path is defined to be true whenever the path is functioning properly, and is not already occupied by a data stream.

Figure 9B:
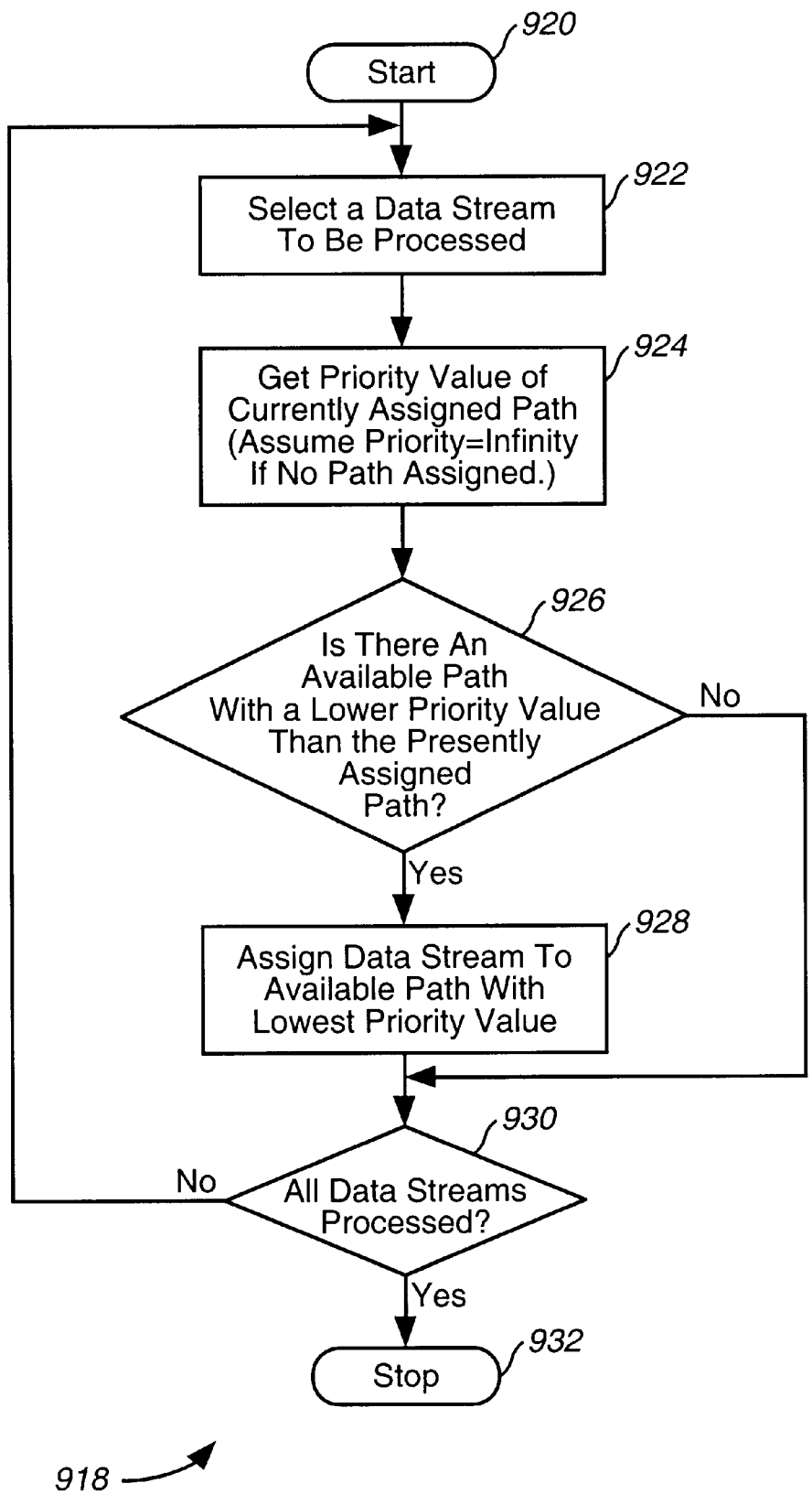
FIG. 9B is a flowchart for assigning priorities to data paths to carry data streams.

Referring to FIG. 9B, a flowchart for using the priority assignment scheme of the present invention to assign priorities to available paths over which data streams are transmitted. Step 920 begins the process by looking through a list of data streams and making decisions about how to assign the data streams to available paths. In step 922, one such data stream is selected as the context for processing in steps 924 through 928. If the data stream is not already assigned to a path, the priority is assumed to be a high positive value greater than any of the entries in the priority table.

In step 926, all of the paths that are indicated to be available are evaluated to see if any of them have a lower priority value than is already assigned to the data stream as determined in step 924. If a path with a lower priority value is found, then in step 928, the data stream is assigned to whichever available path has the lowest priority value. It is also implied that in step 928, that the newly assigned path receives an availability indicator of false, whereas the previously assigned path; if any, is returned to "available" status.

In step 930, the process signifies the completion of a decision involving a single data stream. If the process, in step 928, determines that all data streams to be assigned have been subjected to the process, then execution terminates in step 932. Otherwise, if in step 930, the process determines that other data streams must be processed, then execution resumes at step 922 to select one of the remaining unprocessed data streams.

Applying the present invention to assignment tasks of this nature provides a mechanism for establishing both priority and revertive/non-revertive relationships among different selections. Moreover, during an execution of the process depicted by flowchart 918, if the availability indicators are all set to true and the data streams to be assigned are processed in a particular sequence, the process can assign the most important data to the most desirable paths.

VI. Network Simulation

Figure 10:
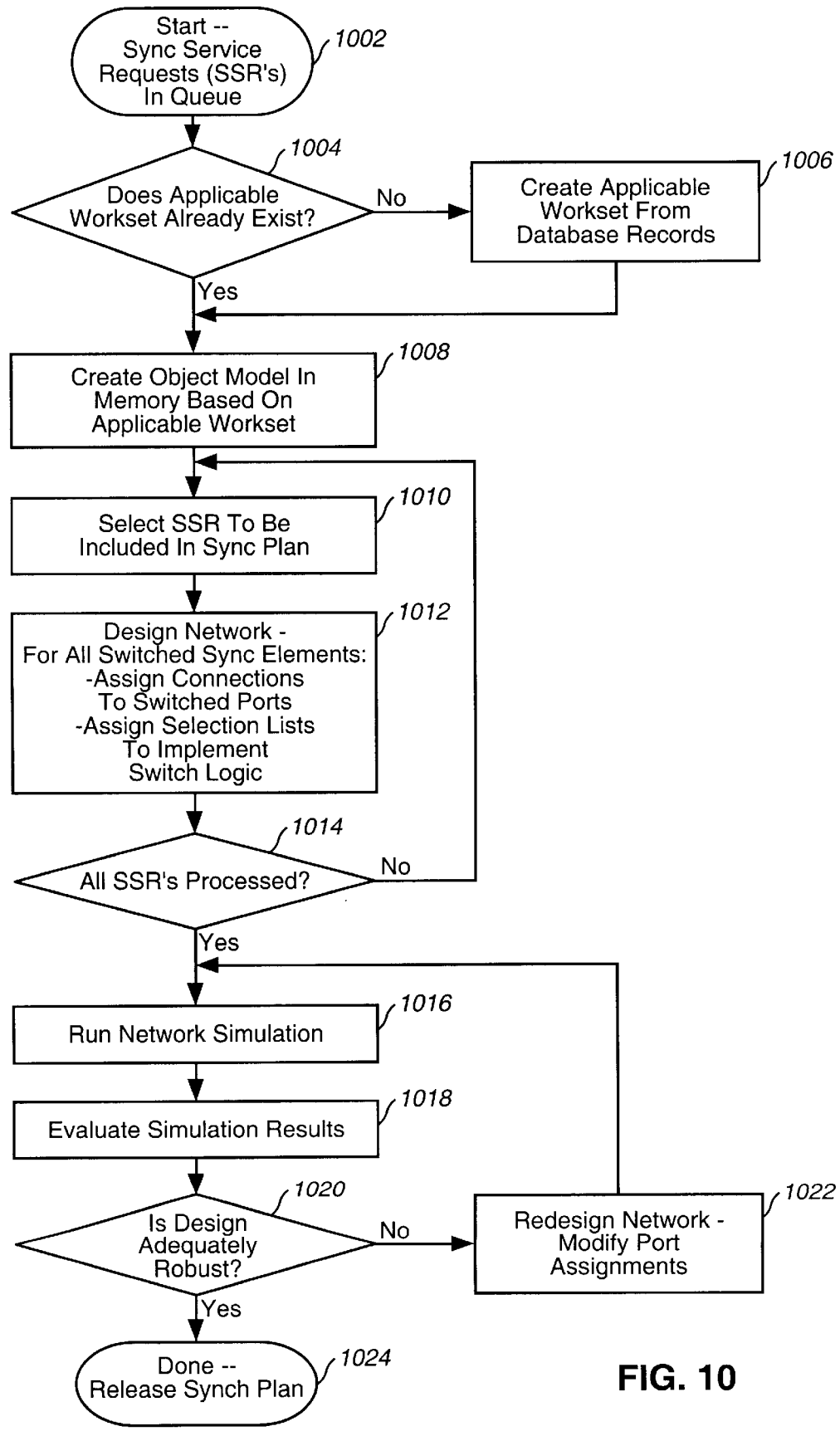
FIG. 10 is a flowchart for simulating the synchronization topology of a telecommunications network using the teaching of the present invention.

FIG. 10 is a flowchart depicting a process by which the NEWS 101 creates a suitable synchronization distribution plan for a given network. The process can be undertaken in response to a Synchronization Service Request (SSR). An SSR is a notification that lists the TSGs and SNEs for which a synchronization plan must be designed. The SSR also specifies a particular date for which a data representation of the network is assembled. As described above, the date can correspond to a projected network configuration in the future. Thus, the data representation can include both the "current" view and one or more "future" views of the network. A network designer can invoke the process illustrated in FIG. 10 to review or modify a network design. Alternatively, the NEWS 101 can automatically perform the process illustrated in FIG. 10 whenever the network reconfigures itself to accomplish restoration following a network failure.

The process begins in step 1002. In step 1002, SSRs are received into a queue. The NEWS 101 simulates the network as it will exist at some point in time by creating a run-time object model. As described above, the run-time object model is based upon a workset residing in the database 120. Each workset residing in the database is associated with a particular date and represents the present and/or future state of the network. Each workset is a composite of numerous records in the database describing the present and planned configuration of parts of the network.

In step 1004, the NEWS 101 determines whether a workset that can adequately represent the network projected to exists as of the latest date specified in the SSRs exists in the database 120. If no such a workset is found in step 1004, then in step 1006 the workset manager 114 composes the required workset from those records in the database that precede the date specified by the SSRs. The records in the database 120 that are used to compose the required workset can reflect both current ("current" view) and projected ("future view") network information. The current information is maintained by direct connection to the existing network through the TMN subsystem 104.

The process continues in step 1008, wherein an applicable workset has been found or constructed. In step 1008, a runtime object model is created based upon the applicable workset.

In step 1010, a particular SSR presented in the input queue in step 1002 is selected for inclusion into an initial synchronization design. In step 1012, the process decides which of many available signals will be connected to the synchronization selector switch for each network or timing generator that has synchronization switching capabilities. In a preferred embodiment, the process, in step 1012 also assigns the contents of the selection table to implement a desired synchronization switching logic for each network element and TSG that supports the use of a switch selection table. The connections and selection table entries determine, for example, which primary synchronization source signal a given TSG will use under normal conditions. Other such assignments can determine which alternate synchronization signal can be used as a reference if a portion of the network fails. The alternate synchronization signal is referred to as the restoration synchronization signal. Other connections can perform a monitoring function, whereby some TSGs are compared against others. In a preferred embodiment, the selection tables can contain priority numbers. The priority number controls revertive switching behavior according to the scheme described in Section V.

In one embodiment, a human network designer performs the selection of port assignments in step 1012. In this embodiment, it is preferable to aid the designer by presenting some metrics that measure the desirability of candidate synchronization signals. One such metric useful in selecting synchronization signals is the Q-metric described in Section V. Another useful metric is a measure of the relative path diversity among the selected paths.

While a human designer can implement reasonable connections, it is further contemplated that the selection and review of candidate synchronization paths can be similarly implemented by an automatic or semi-automatic process. The automatic or semi-automatic process can operate, for example, as a data manipulating process with the NEWS 101.

In step 1014, the process determines if all queued SSRs have been included in the initial design. If there are more SSRs, the processing resumes at step 1010 to satisfy any remaining SSRs in the initial design. If step 1014 finds that an initial design has processed all SSRs, then a network simulation is executed in step 1016.

As is well known to those skilled in the art, the simulation step 1016 typically involves the instantiating data objects that model the physical network, executing the simulation to allow the data objects to simulate the behavior of actual network elements, and recording the state of the objects at increments of simulated time.

During the simulation, the simulator can continuously observe the data model for compliance with engineering guidelines. In the preferred embodiment, the engineering guidelines include the requirements that:

a) each SNE must be provided with a primary timing reference input with traceability to a Stratum-1 reference source;

b) each SNE must be provided with at least one restoration reference input with traceability to a Stratum-1 reference source;

c) primary and restoration timing paths must be physically diverse;

d) each SNE must be monitored by at least one other SNE;

e) each SNE in the hierarchy may only receive reference from an SNE of equal or greater stratum level; and f) no SNE in the network can provide reference timing to itself (i.e., no timing loops).

The process continues in step 1018. In step 1018, the simulation results are evaluated to determine the robustness of the design and its adherence to the above engineering guidelines.

The process then continues in step 1020. In step 1020, the process determines whether the simulation results from steps 1016 and 1018 indicate an adequate synchronization topology. If the simulation results are deemed to meet robustness criteria, then the process completes in step 1024. In step 1024, the synchronization plan is released for use as being a viable design. Otherwise, if in step 1020, the simulated network is found to be inadequate, the network is effectively redesigned by changing port assignments, and the process repeats in step 1016 by starting a new simulation.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A telecommunications network management system, comprising:

a network object model representing a telecommunications network having a plurality of sites that are physically interconnected by a plurality of physical connections and logically interconnected by a plurality of logical connections, said network object model being created from information extracted from said telecommunications network;

first display means for displaying a topological view of said telecommunications network, said topological view providing a view of said plurality of sites and said plurality of logical connections interconnecting said sites according to said network object model, each of said plurality of logical connections identifying a pair of sites that are configured to communicate with one another, and each of said plurality of logical connections being associated with one or more of said plurality of physical connections;

second display means for displaying a topographical view of said telecommunications network, said topographical view providing a view of said plurality of sites and said physical connections interconnecting said plurality of sites;

selecting means for selecting a logical connection displayed in said topological view; and a linking means for linking said topographical view with said topological view, wherein said linking means highlights said one or more physical connections associated with a selected logical connection.

2. The telecommunications network management system of claim 1, wherein said plurality of sites include a source site, a sink site, and an intervening site.

3. The telecommunications network management system of claim 1, wherein said first display means includes means for highlighting failed portions of said telecommunications network in said topological view.

4. The telecommunications network management system of claim 1, wherein said second display means includes means for highlighting failed portions of said telecommunications network in said topographical view.

5. The telecommunications network management system of claim 1, wherein said information extracted from said telecommunications network is stored in a manner consistent with a telecommunications management network (TMN) standard having extensions for representing connections between network elements in said telecommunications network.

6. The telecommunications network management system of claim 1, further including a selection device to enable a user to select one of said plurality of sites.

7. The telecommunications network management system of claim 6, further including means for displaying a logical view of said telecommunications network upon said user selecting said one of said plurality of sites, said logical view displaying connectivity for said selected site.

8. A method for managing a telecommunications network having a plurality of sites that are physically interconnected by a plurality of physical connections and logically interconnected by a plurality of logical connections, wherein each of the plurality of logical connections are associated with one or more of the plurality of physical connections, and each logical connection identifies a pair of sites that are configured to communicate with one another, comprising the steps of:

extracting information from the telecommunications network to create a network object model representing the telecommunications network;

displaying a topological view of the telecommunications network according to said network object model, said topological view providing a view of the plurality of sites and the plurality of logical connections interconnecting the plurality of sites;

displaying a topographical view of the telecommunications network, said topographical view providing a view of the plurality of sites and the physical connections interconnecting the plurality of sites; and upon a user selecting one of said plurality of logical connections, linking said topographical view with said topological view.

9. The method of claim 8, wherein said step of linking said topographical view with said topological view includes the step of highlighting the one or more physical connections displayed in said topographical view that are associated with said one of said plurality of logical connections selected by said user.

10. The method of claim 8, further including the step of highlighting failed portions of said telecommunications network in said topological view.

11. The method of claim 10, further including the step of highlighting failed portions of said telecommunications network in said topographical view.

12. The method of claim 8, further comprising the step of storing said information extracted from the telecommunications network in a manner consistent with a TMN standard having extensions for representing connections between network elements in the telecommunications network.

13. The method of claim 8, further including the stop of displaying a logical matrix upon a user selecting a portion of the telecommunications network displayed in said topological view or said topographical view.

14. The method of claim 13, wherein said logical matrix displays connectivity for a selected site.

15. The method of claim 14, wherein said logical matrix displays connectivity for a selected logical connection.

16. The method of claim 15, wherein said logical matrix displays connectivity for a selected physical link.

17. The method of claim 8, further including the step of predicting where the telecommunications network is likely to fail using said topographical and topological views.

18. The method of claim 8, further including the step of monitoring self-restoration capabilities of the telecommunications network using said topographical and topological views.

\* \* \* \* \*